United States Patent [19]

Ichikawa et al.

[11] Patent Number: 5,760,929
[45] Date of Patent: Jun. 2, 1998

[54] IMAGE PROCESSING APPARATUS FOR PROCESSING DISCRIMINATED COLOR REGIONS WITHIN SPECIFIED BOUNDARIES

[75] Inventors: Hiroyuki Ichikawa, Kawasaki; Keizo Isemura, Musashino, both of Japan

[73] Assignee: Canon Kabushiki Kaisha, Tokyo, Japan

[21] Appl. No.: 223,814

[22] Filed: Apr. 6, 1994

Related U.S. Application Data

[63] Continuation of Ser. No. 720,662, Jun. 25, 1991, abandoned.

[30] Foreign Application Priority Data

Jun. 25, 1990 [JP] Japan ................................. 2-164316

[51] Int. Cl.$^6$ ........................................................ G03F 3/08
[52] U.S. Cl. ............................ 358/518; 358/464; 358/467
[58] Field of Search ................................... 358/443, 448, 358/462, 464, 467, 470, 471, 517, 530, 537, 540; 382/22, 55; 345/144, 113, 114, 116; 395/135, 150

[56] References Cited

U.S. PATENT DOCUMENTS

| | | |
|---|---|---|
| 4,369,461 | 1/1983 | Tamura .................................. 358/75 |
| 4,682,190 | 7/1987 | Ikeda .................................... 346/154 |
| 4,839,634 | 6/1989 | More et al. ........................... 340/712 |
| 4,908,701 | 3/1990 | Udagawa ............................... 358/80 |
| 4,922,332 | 5/1990 | Taniguchi et al. .................... 358/75 |
| 4,956,704 | 9/1990 | Yamada ................................. 358/80 |
| 5,028,991 | 7/1991 | Sekizawa et al. .................... 355/537 |
| 5,034,806 | 7/1991 | Ikeda et al. .......................... 358/450 |

FOREIGN PATENT DOCUMENTS

| | | | |
|---|---|---|---|
| 886414 | 10/1988 | European Pat. Off. | ......... H04N 1/40 |
| 2150728 | 11/1984 | United Kingdom | ............ G09F 23/06 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An image processing apparatus of a digital copying machine or the like comprises: a color discriminating circuit to discriminate a color of an input image; a discrimination image generator to generate a color discrimination image in accordance with the discriminated color; and a trimming circuit to trim a boundary portion between the color discrimination image generated and another image. A blank portion or a boundary line is formed in the boundary portion between the color discrimination image and another image. The trimming circuit can also trim a portion in the color discrimination image in the boundary portion.

28 Claims, 27 Drawing Sheets

LOWER ADDRESS

|   | 0 | 1 | 2 |   |   |   |   | 7 |
|---|---|---|---|---|---|---|---|---|
| 0 | 1 | 0 | 1 | 0 | 1 | 0 | 1 | 0 |
| 1 | 0 | 1 | 0 | 1 | 0 | 1 | 0 | 1 |
| 2 | 1 | 0 | 1 | 0 | 1 | 0 | 1 | 0 |
| 3 | 0 | 1 | 0 | 1 | 0 | 1 | 0 | 1 |
| 4 | 1 | 0 | 1 | 0 | 1 | 0 | 1 | 0 |

UPPER ADDRESS

FIG. 19C
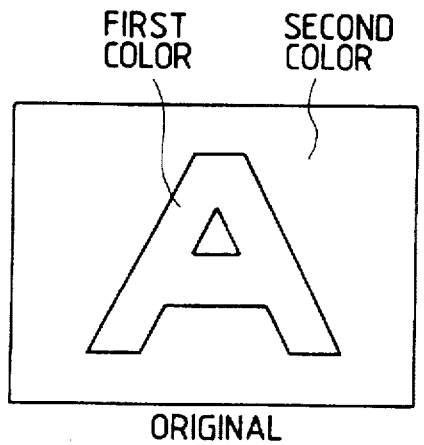
FIRST COLOR  SECOND COLOR
ORIGINAL
FIG. 19A1
PATTERN  NON PATTERN
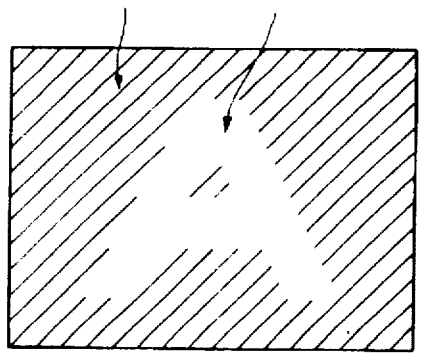
FIG. 19A2
PATTERN  PATTERN
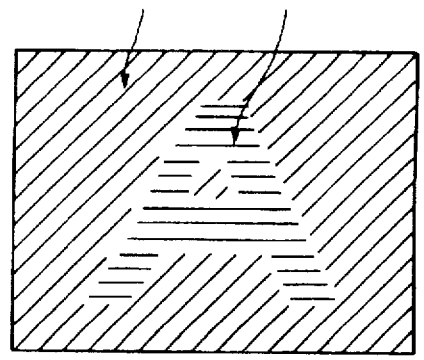
FIG. 19B
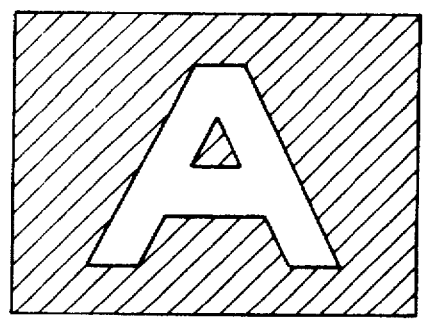

FIG. 26A
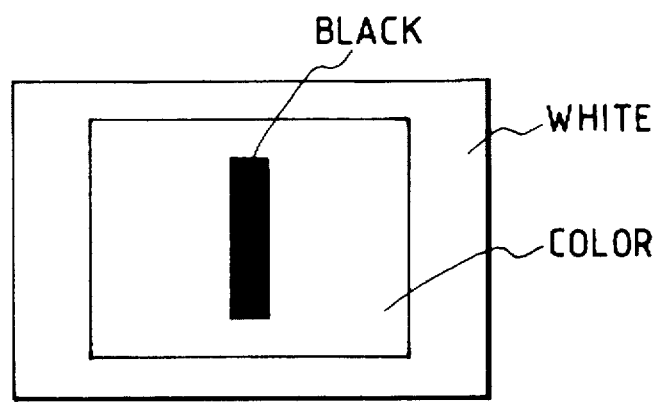
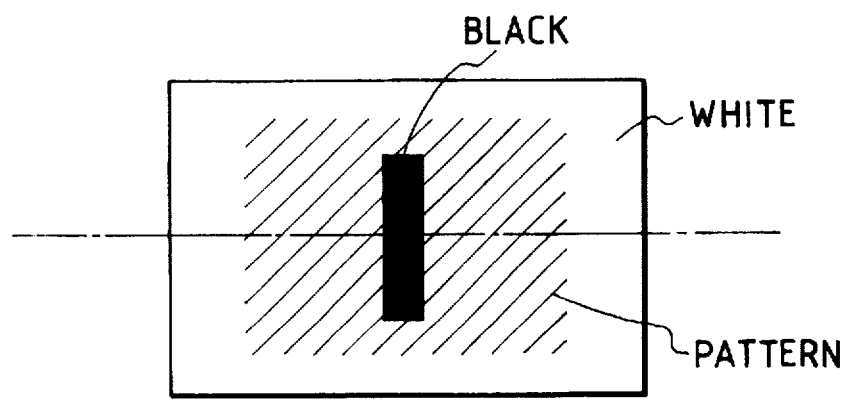
IN-COLOR
BLACK
CHARACTER
CONTOUR
SIGNAL

FIG. 26B
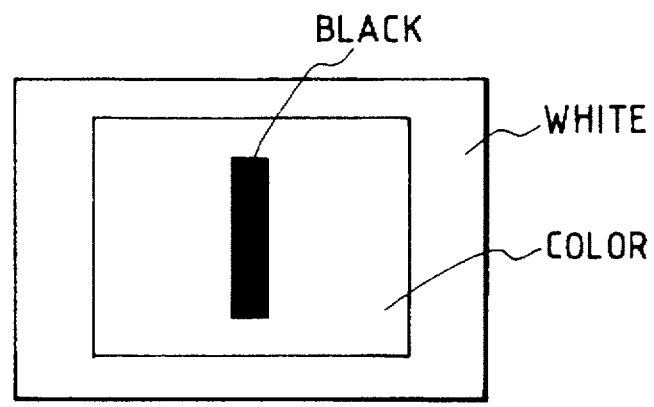
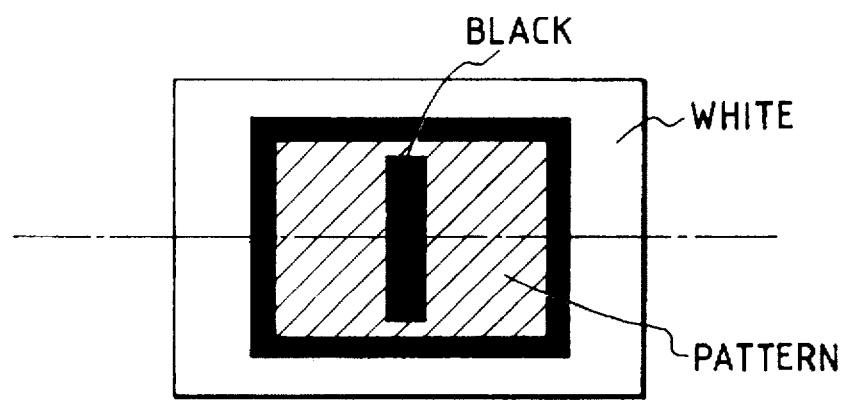

FIG. 26C
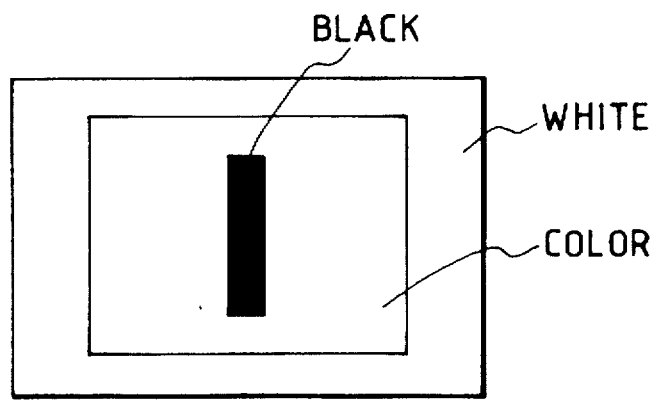
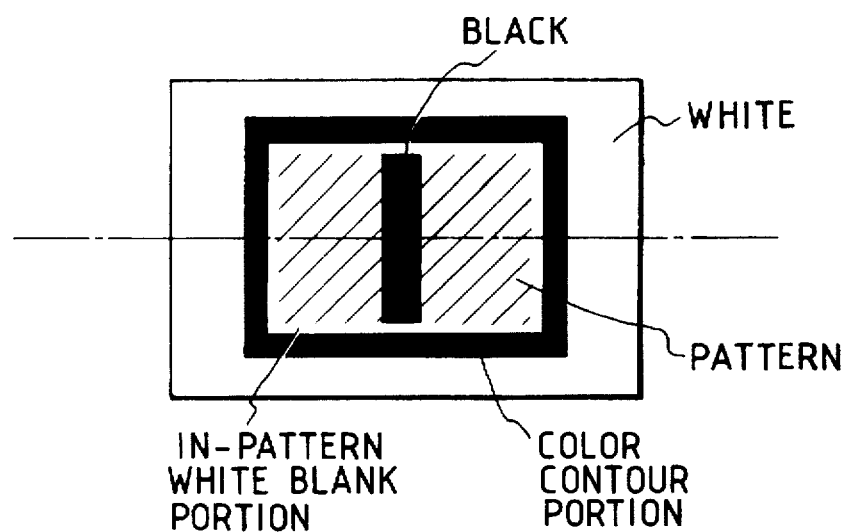

FIG. 28
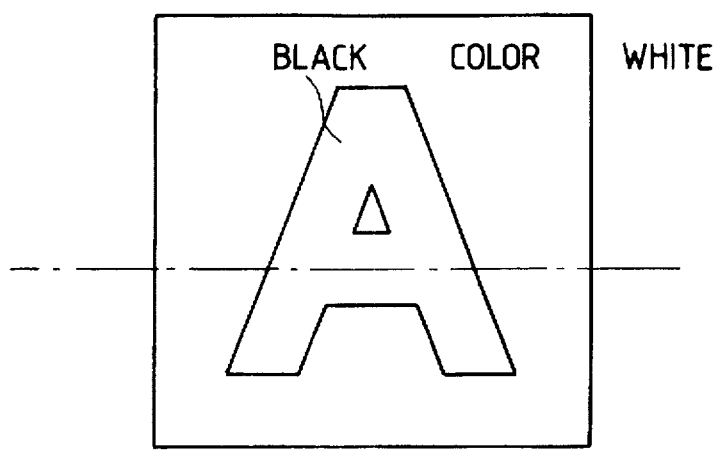

COLOR DETECTION SIGNAL

OUTPUT OF AND GATE 287

OUTPUT OF OR GATE 277

OUTPUT OF 7×7 AND CKT

OUTPUT OF 5×5 AND CKT

OUTPUT OF EXOR 280

OUTPUT OF EXOR 282

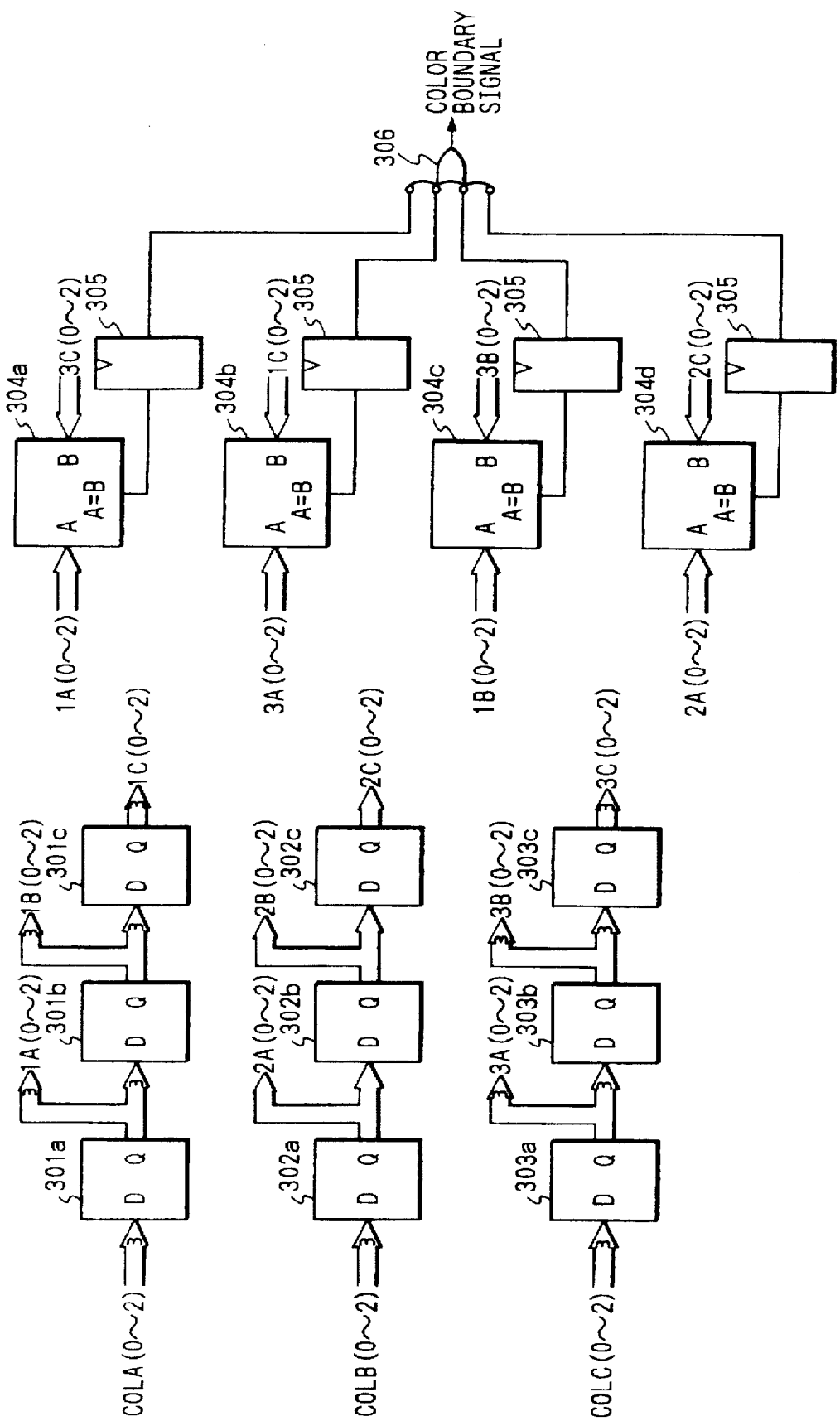

FIG. 31A   FIG. 31B   FIG. 31C   FIG. 31D
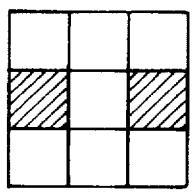 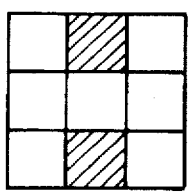 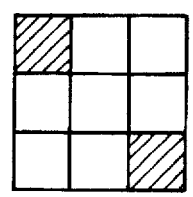 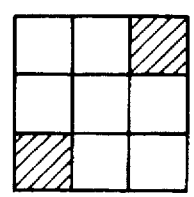
FIG. 32C
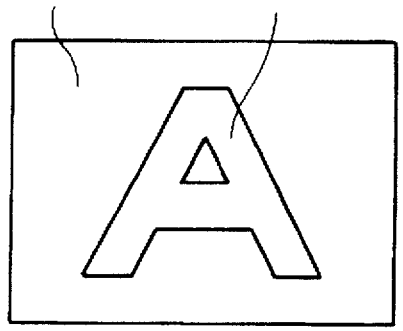
FIRST COLOR   SECOND COLOR
ORIGINAL
FIG. 32A
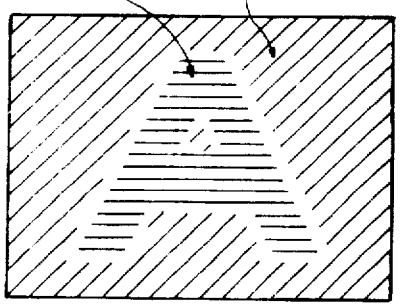
FIRST PATTERNING
SECOND PATTERNING
FIG. 32B
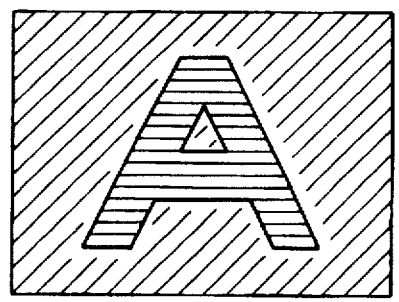

IMAGE PROCESSING APPARATUS FOR PROCESSING DISCRIMINATED COLOR REGIONS WITHIN SPECIFIED BOUNDARIES

This application is a continuation of application Ser. No. 07/720,662 filed Jun. 25, 1991, now abandoned.

BACKGROUND OF THE INVENTION

1. Field of the Invention

The invention relates to an image processing apparatus of a digital copying apparatus, an image scanner, a printer, a facsimile apparatus, a display apparatus, their interface apparatuses, or the like.

2. Related Background Art

In an image processing apparatus such as a digital copying apparatus, an original is illuminated by a halogen lamp or the like and a reflected light is photoelectrically converted by using a photoelectric conversion device such as a CCD or the like and, thereafter, the electric signal is converted into the digital signal and is subjected to predetermined processes, and an image is subsequently formed by using a recording apparatus such as laser beam printer, liquid crystal printer, thermal printer, an ink jet printer, or the like.

In association with the realization of a color image formation of a copy original or the like, an output of a large information amount is demanded. In recent years, a copying apparatus in which the color is partially changed and a color image is copied by using developing devices of a plurality of colors has been developed.

A method whereby a color portion of an original is converted into a pattern and generated in order to show information of a plurality of colors by a monochromatic printer or a display has been proposed in U.S. Pat. No. 4,369,461.

However, in the above conventional method, since a predetermined color of an original is patterned by an output apparatus of a monochromatic color, for instance, in the case where only the first color of a background portion in FIG. 19C has been patterned, a resultant image is very hard to see so long as an image as shown in FIG. 19A1 was formed.

Even in the case patterning both of the first and second colors of the original of FIG. 19C, it is fairly difficult to discriminate a background and an information portion as shown in FIG. 19A2.

SUMMARY OF THE INVENTION

It is an object of the invention to provide an image processing apparatus which can solve the foregoing problems.

Another object of the invention is to provide an image processing apparatus in which when color information is patterned or different concentrations are respectively assigned to a plurality of color information and the color information is displayed, the patterns or the concentrations can be easily discriminated.

To accomplish the above objects, according to the invention, there is provided an image processing apparatus comprising: color discriminating means for discriminating a color of an input image; generating means for generating a pattern and/or a concentration in accordance with a result of the color discrimination by the color discriminating means; and trimming processing means for trimming a periphery of the information image generated by the generating means. The pattern and/or the concentration can be easily discriminated by the trimming process and the image information of the original can be easily discriminated.

The above and other objects and features of the present invention will become apparent from the following detailed description and the appended claims with reference to the accompanying drawings.

BRIEF DESCRIPTION OF THE DRAWINGS

FIGS. 19A1, 19A2, 19B, and 19C are diagrams showing the trimming according to the first embodiment;

FIG. 25-1 is a circuit diagram of the third embodiment;

FIG. 25-2 is a block diagram showing a construction of a color detection circuit 259 of the third embodiment;

FIGS. 26A to 26C are explanatory diagrams of the trimming process according to the third embodiment;

FIGS. 28 and 29 are explanatory diagrams of the trimming process of the third embodiment;

FIG. 30 is a diagram of a color boundary detection circuit of the fourth embodiment;

FIGS. 31A to 31D are explanatory diagrams of the color boundary detection of the fourth embodiment; and FIGS. 32A to 32C are explanatory diagrams of the trimming process according to the fourth embodiment.

DETAILED DESCRIPTION OF THE PREFERRED EMBODIMENTS

Embodiments of the invention will be described in detail hereinbelow with reference to the drawings.

Figure 1:
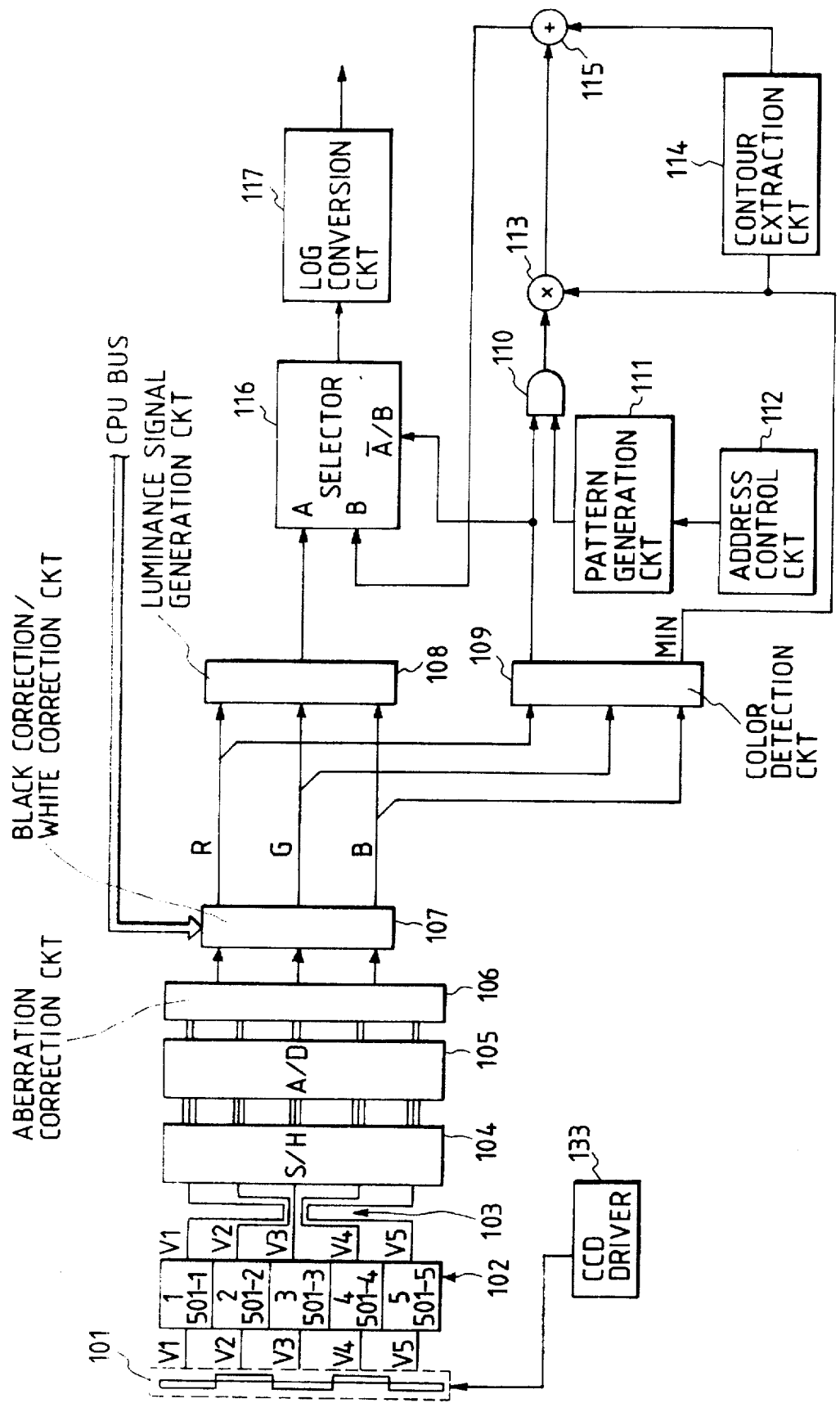
FIG. 1 is a block diagram showing the first embodiment of the invention.

FIG. 1 shows the first embodiment of the invention.

FIG. 1 relates to an example of an image processing circuit apparatus. A full-color original is exposed by an exposure lamp (not shown). A reflected color image is photographed by a color CCD image sensor. A resultant analog image signal is converted into a digital signal by an A/D converter or the like. The digital full-color image signal is processed. The processed signal is supplied to a thermal printer, an ink jet printer, a laser beam printer, or the like (not shown), by which an image is obtained.

The original is first illuminated by the exposure lamp (not shown). The reflected light is color separated every image by a color CCD image sensor 101. The respective color signals are read and amplified to predetermined levels by an amplifying circuit 102. The color CCD image sensor 101 is driven by a CCD driver 133.

Figure 2:
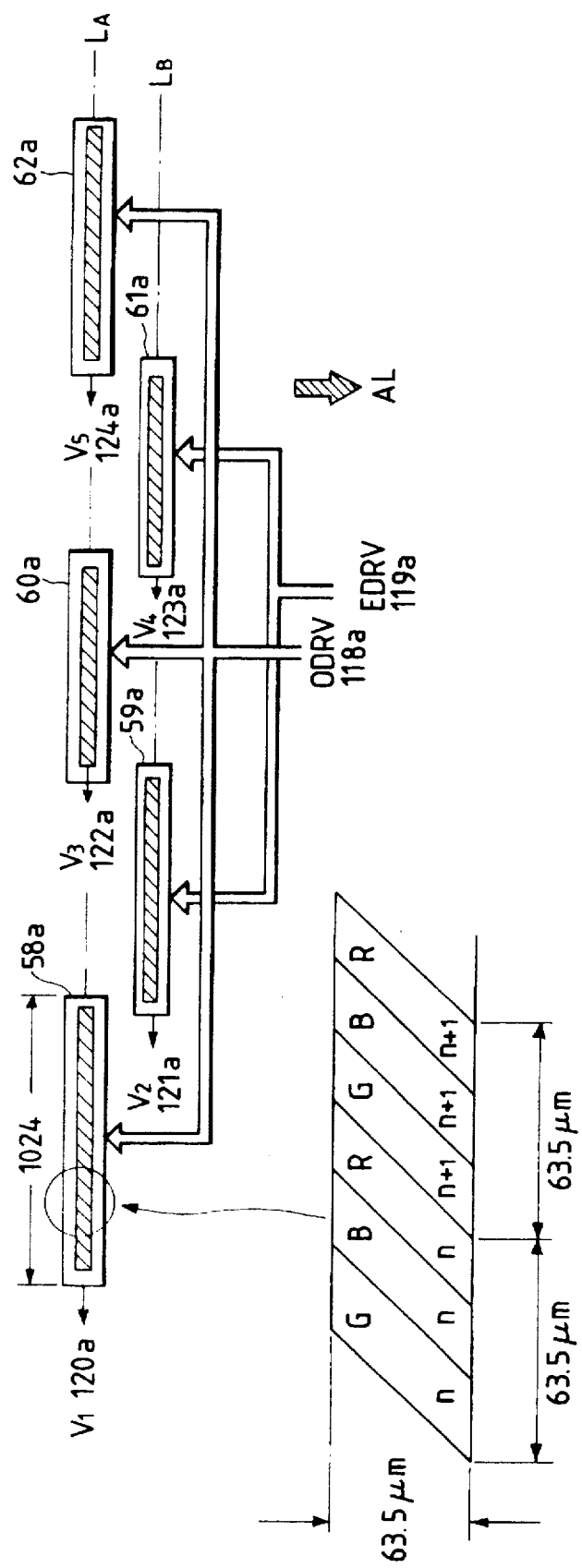
FIG. 2 is a diagram showing a construction of a color CCD image sensor 101 shown in FIG. 1.

FIG. 2 shows the color CCD image sensor 101 shown in FIG. 1.

The color CCD image sensor which is used in the embodiment has total 3072=(1024×3) effective pixels because one pixel is set to 63.5 μm and each pixel is divided into three effective pixels of G (green), B (blue), and R (red) in the main-scanning direction as shown in the diagram for 400 d.p.i. (dots per inch) and 1024 pixels in order to read image signals by dividing the original into five regions in the main-scanning directions. On the other hand, five sensors chips 58a to 62a are formed on the same ceramics substrate. The first, third, and fifth chips 58a, 60a, and 62a are arranged on a same line LA. The second and fourth chips 59a and 61a are arranged on a line LB which is away from the line LA by only a distance of four lines, that is, 254 μm (63.5 μm×4). When the original is read, the original is scanned in the direction indicated by an arrow AL.

Figure 3:
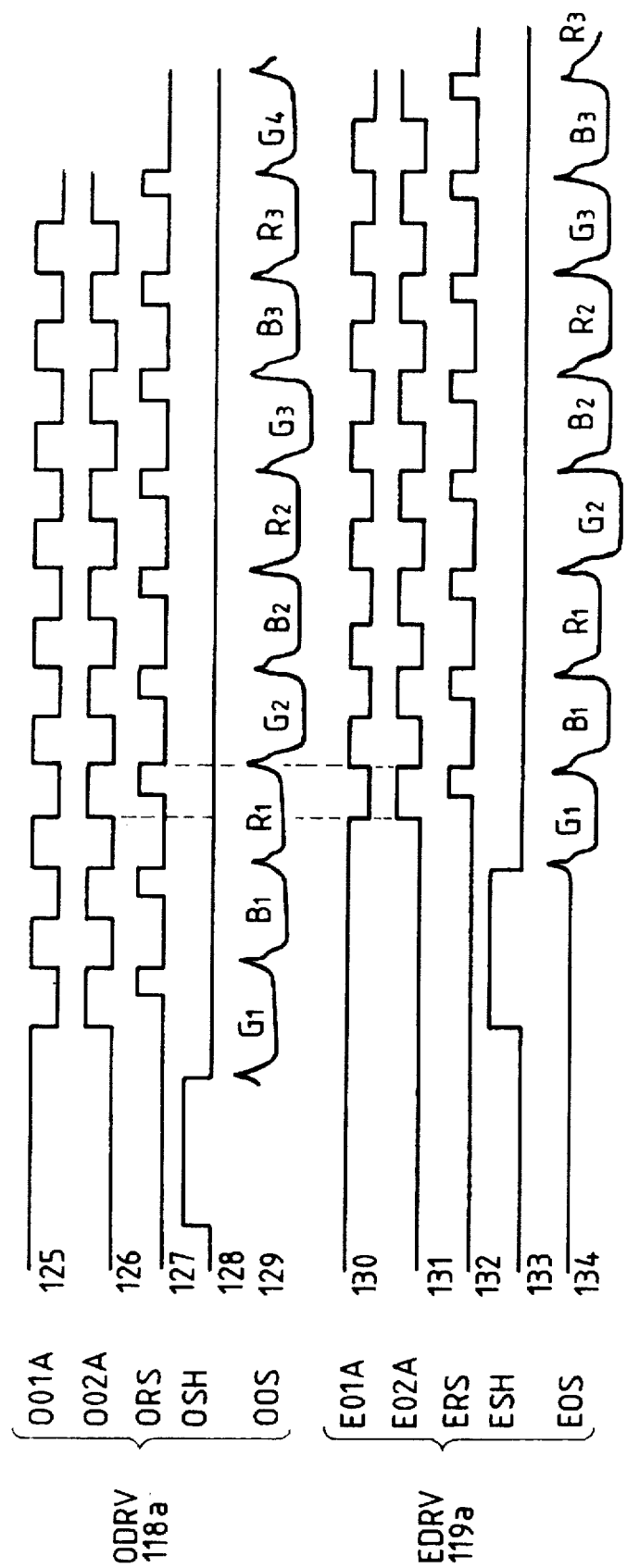
FIG. 3 is a timing chart showing examples of timings of CCD drive pulses shown in FIG. 2.

FIG. 3 is a timing chart showing examples of timings of drive pulses shown in FIG. 2.

Among the five CCD chips, the first, third, and fifth chips are independently synchronously driven by a group of drive pulses ODRV 118a and the second and fourth chips are also independently synchronously driven by a group of drive pulses EDRV 119a, respectively. Reference numerals 001A, 002A, and ORS included in the drive pulses ODRV 118a denote charge transfer clocks in the sensors. Reference numerals E01A, E02A, and ERS included in the drive pulses EDRV 119a denote charge reset pulses in the sensors. The above clocks or pulses are substantially synchronously generated so as not to cause a jitter in order to limit mutual interferences or noises among the first, third, and fifth pulses and the second and fourth pulses. For this purpose, those pulses are generated from a single reference oscillating source OSC (not shown).

Figure 4:
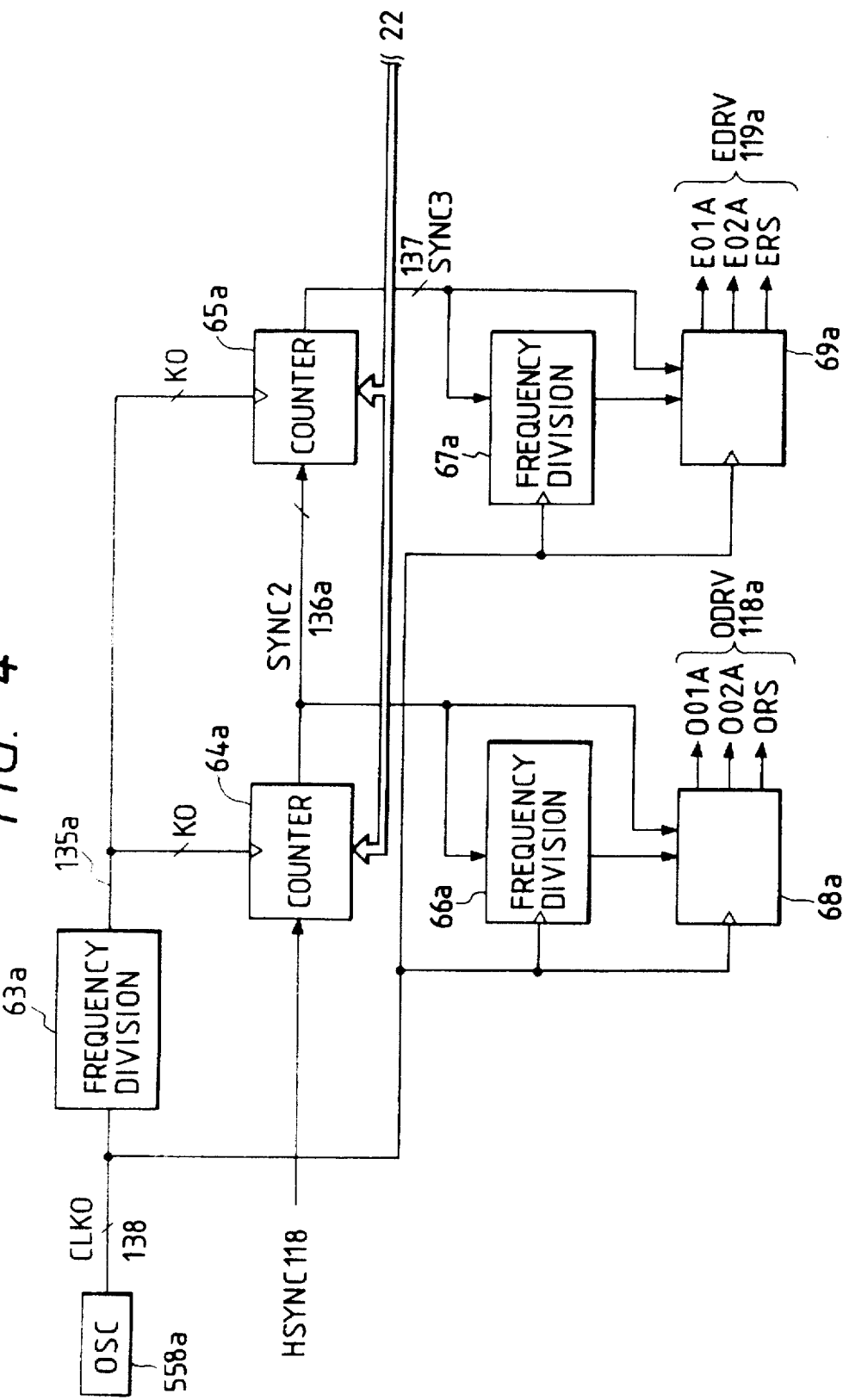
FIG. 4 is a block diagram showing a construction of a CCD driver 133 shown in FIG. 1.
Figure 5:
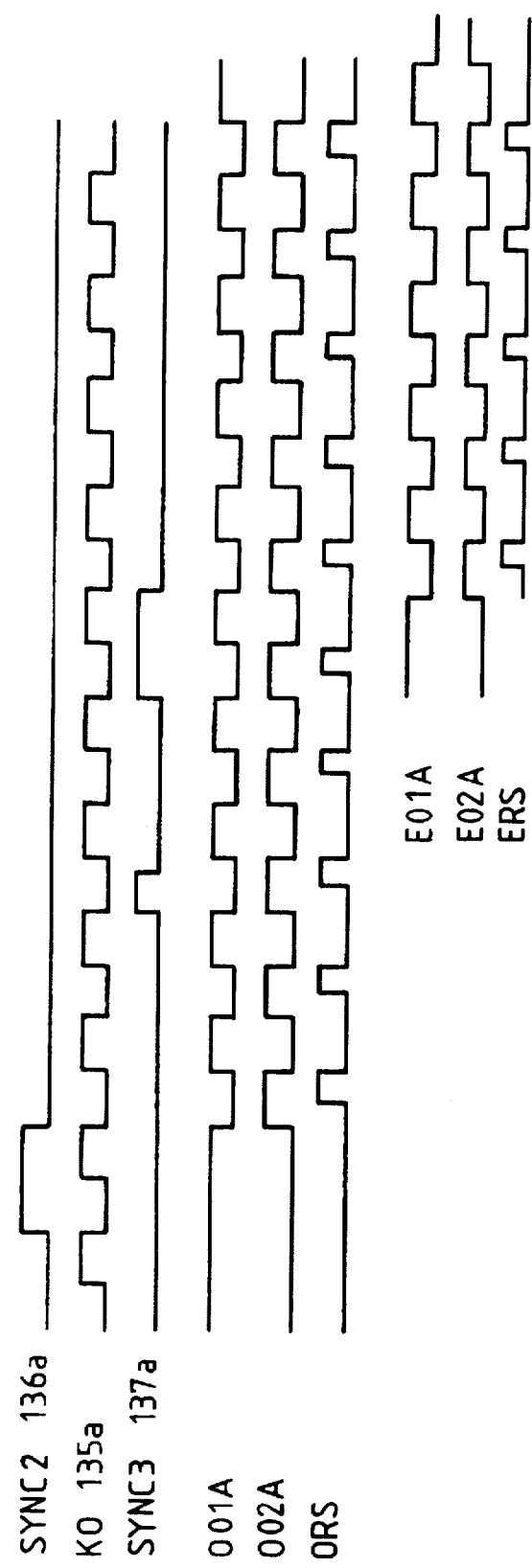
FIG. 5 is a timing chart showing examples of timings in respective sections shown in FIG. 4.

FIG. 4 shows a construction of the CCD driver 133 shown in FIG. 1. FIG. 5 is a timing chart showing examples of timings in the respective sections shown in FIG. 4.

Clocks KO 135a which are obtained by frequency dividing original clocks CLKO generated from a single oscillating source OSC 558a are used to generate reference signals $SYNC_2$ and $SYNC_3$ to decide generation timings of the pulses ODRV and EDRV. Output timings of the reference signals $SYNC_2$ and $SYNC_3$ are determined in accordance with set values of presettable counters 64a and 65a which are set by a signal line 22 connected to a CPU bus. Frequency dividers 66a and 67a and drive pulse generation circuits 68a and 69a are initialized by the reference signals $SYNC_2$ and $SYNC_3$. That is, the pulse groups ODRV 118a and EDRV 119a are produced by the original clocks CLKO all of which are generated from the single OSC 558a and by the frequency division clocks all of which are synchronously generated while using an input horizontal sync signal HSYNC 118 as a reference. Consequently, those pulses are derived as synchronized signals having no jitter. A disturbance of the signals due to interferences among the sensors can be prevented.

The sensor drive pulses ODRV 118a obtained synchronously with each other are supplied to the first, third, and fifth sensors 58a, 60a, and 62a. The synchronized drive pulses EDRV 119a are supplied to the second and fourth sensors 59a and 61a. Video signals $V_1$ to $V_5$ are independently generated from the sensors 58a, 59a, 60a, 61a, and 62a synchronously with the drive pulses and are amplified to predetermined voltage values by independent amplifying circuits 501-1 to 501-5 every channels shown in FIG. 1. The video signals $V_1$, $V_3$ and $V_5$ are transmitted through a coaxial cable 103 at timings of a pulse OOS 129a shown in FIG. 3. The video signals $V_2$ and $V_4$ are transmitted through the coaxial cable 103 at timings of a pulse EOS 134a. The above video signals $V_1$ to $V_5$ are respectively supplied to a video image processing circuit.

The color image signals which had been obtained by dividing the original to five regions and reading the image signals therefrom and which have been supplied to the video image processing circuit are respectively separated into the signals of three colors of G (green), B (blue), and R (red) by a sample and hold circuit (S/H circuit) 104. Thus, after the color image signals were sampled and held by the S/H circuit 104, fifteen (3×5) kinds of signals are processed.

Returning to FIG. 1, the analog color image signals which have been sampled and held by the S/H circuit 104 every colors R, G, and B are converted into the digital signals by an A/D converting circuit 105 every channels 1 to 5. The digital signals are independently supplied in parallel to an aberration correction circuit 106 every channels 1 to 5.

In the embodiment, as mentioned above (refer to FIG. 2), an interval corresponding to four lines, namely, 254 μm (=63.5 μm×4) is provided in the sub-scanning direction and the original is read by five zigzag sensors for the five regions obtained by dividing the original into five portions in the main-scanning direction. Therefore, there is a deviation between the reading positions of the channels 2 and 4 which have previously been scanned and the remaining channels 1, 3, and 5. To match the reading positions, such a deviation of the reading positions is corrected by the aberration correction circuit 106 having a memory of a plurality of lines.

Figure 6:
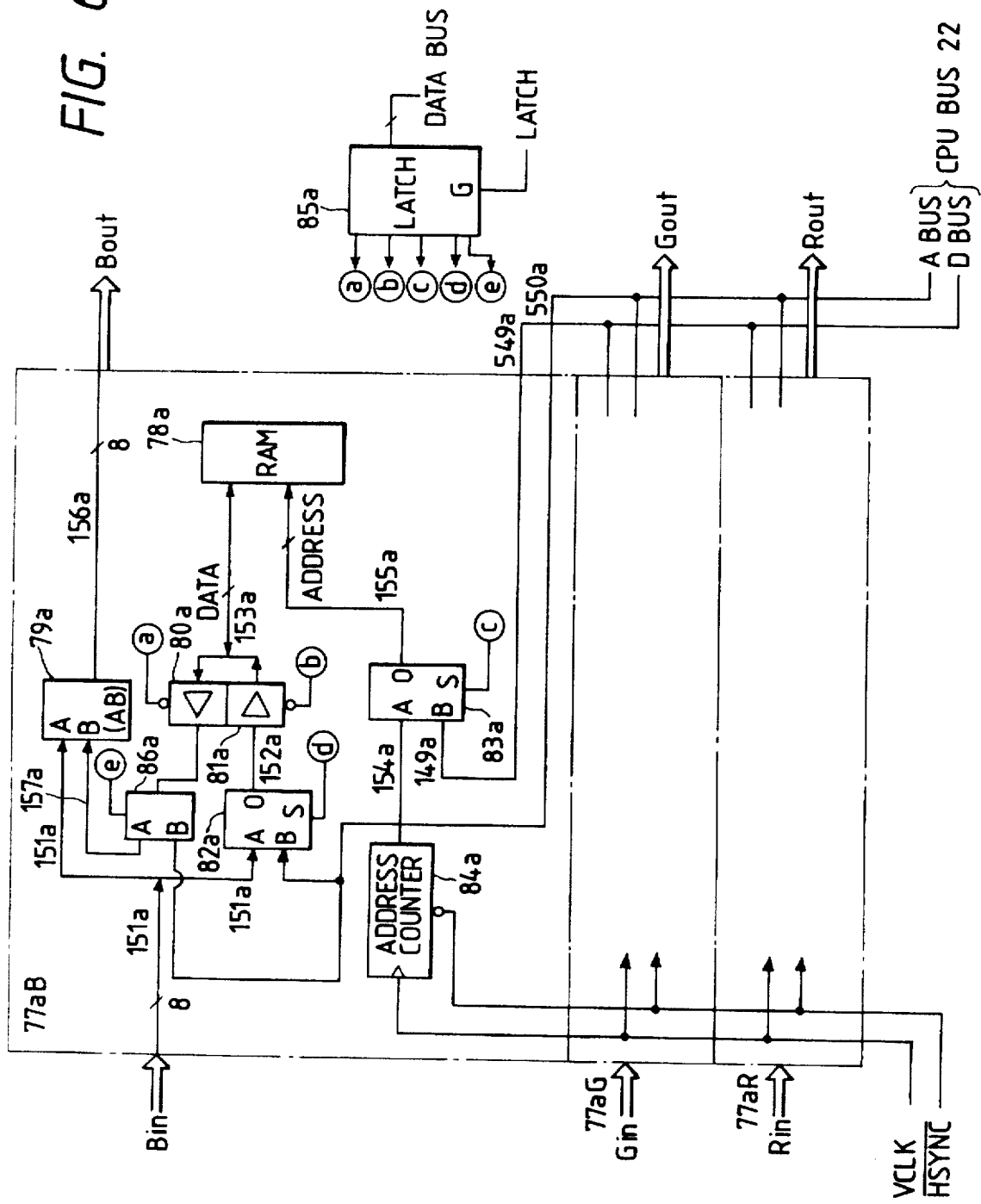
FIG. 6 is a block diagram showing a construction of a black correction circuit in a black correction/white correction circuit shown in FIG. 1.

FIG. 6 shows a construction of a black correction circuit in a black correction/white correction circuit 107 shown in FIG. 1.

Figure 7:
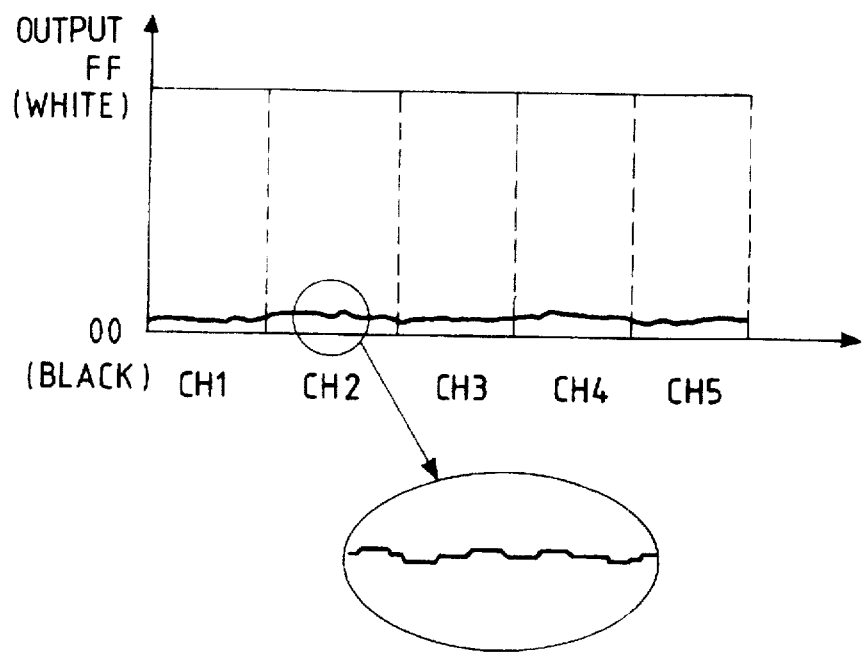
FIG. 7 is a diagram showing the concept of black correction.

As shown in FIG. 7, in the black level outputs of the channels 1 to 5, there are large variations among the chips and among the pixels when an amount of light which enters the color CCD image sensors is very small. If such black level outputs are directly supplied and an image is generated, stripes or a variation occur in the data portion of the image. To prevent them, it is necessary to correct an output variation of the black portion. Such an output variation is corrected by the circuit as shown in FIG. 6.

Prior to the original reading operation, the original scanning unit is moved to a position of a black plate having a uniform concentration arranged in a non-image region of the front edge portion of the original base plate. The exposure lamp is lit on. The black level image signal is supplied to the black correction circuit. With respect to a blue signal $B_{IN}$, in order to store the image data of one line into a black level RAM 78a, a terminal A is selected by a selector 82a ((d)), a gate 80a is closed ((a)), and a gate 81a is opened. That is, data lines are connected such as 151a→152a→153a. On the other hand, a signal (c) is supplied to a selector 83a so that an output 154a of an address counter 84a which is initialized by a signal $\overline{HSYNC}$ and counts pixel clocks VCLK is supplied as an address input 155a of the RAM 78a. The black level signal of one line is stored into the RAM 78a (the above state is called a black reference value fetching mode).

Figure 12:
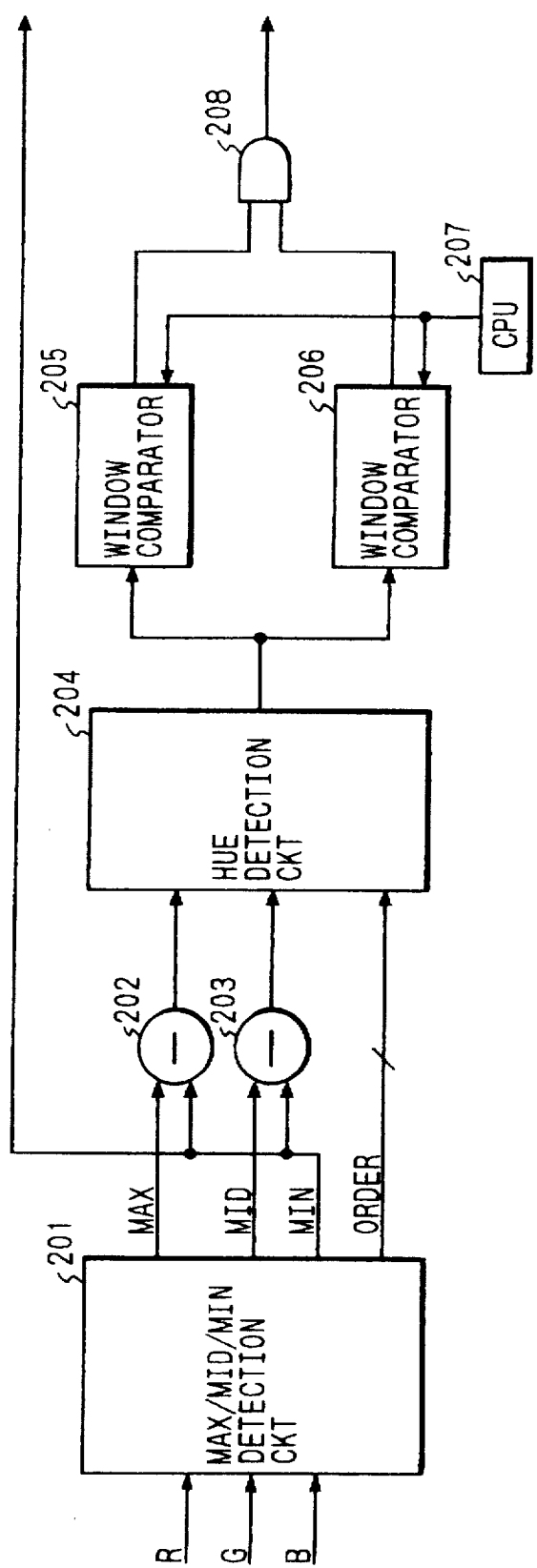
FIG. 12 is a block diagram showing a construction of a color detection circuit 109 shown in FIG. 1.

Upon reading of an image, the RAM 78a is set into a data reading mode. Data is read out of the RAM 78a every line and every pixel and is supplied to a B input terminal of a subtracter 79a along a path of a data line 153a→157a. That is, at this time, the gate 81a is closed ((b)) and the gate 80a is opened ((a)). A selector 86a is connected to an A output. Therefore, for instance, in the case of a blue signal, a black correction circuit output 156a is derived as $B_{IN}(i)-DK(i)=B_{OUT}(i)$ for black level data DK(i) (the above state is called a black correcting mode). Similarly, controls are also executed for a green signal $G_{IN}$ and a red signal $R_{IN}$ by signals 77aG and 77aR. Control lines (a), (b), (c), (d), and (e) of gates of the selectors for the above control are controlled by a CPU on the basis of a latch 85a assigned as an I/O of a CPU 207 (FIG. 12). By selecting B input terminals of the selectors 82a, 83a, and 86a, the RAM 78a can be accessed by the CPU 207.

Figure 8:
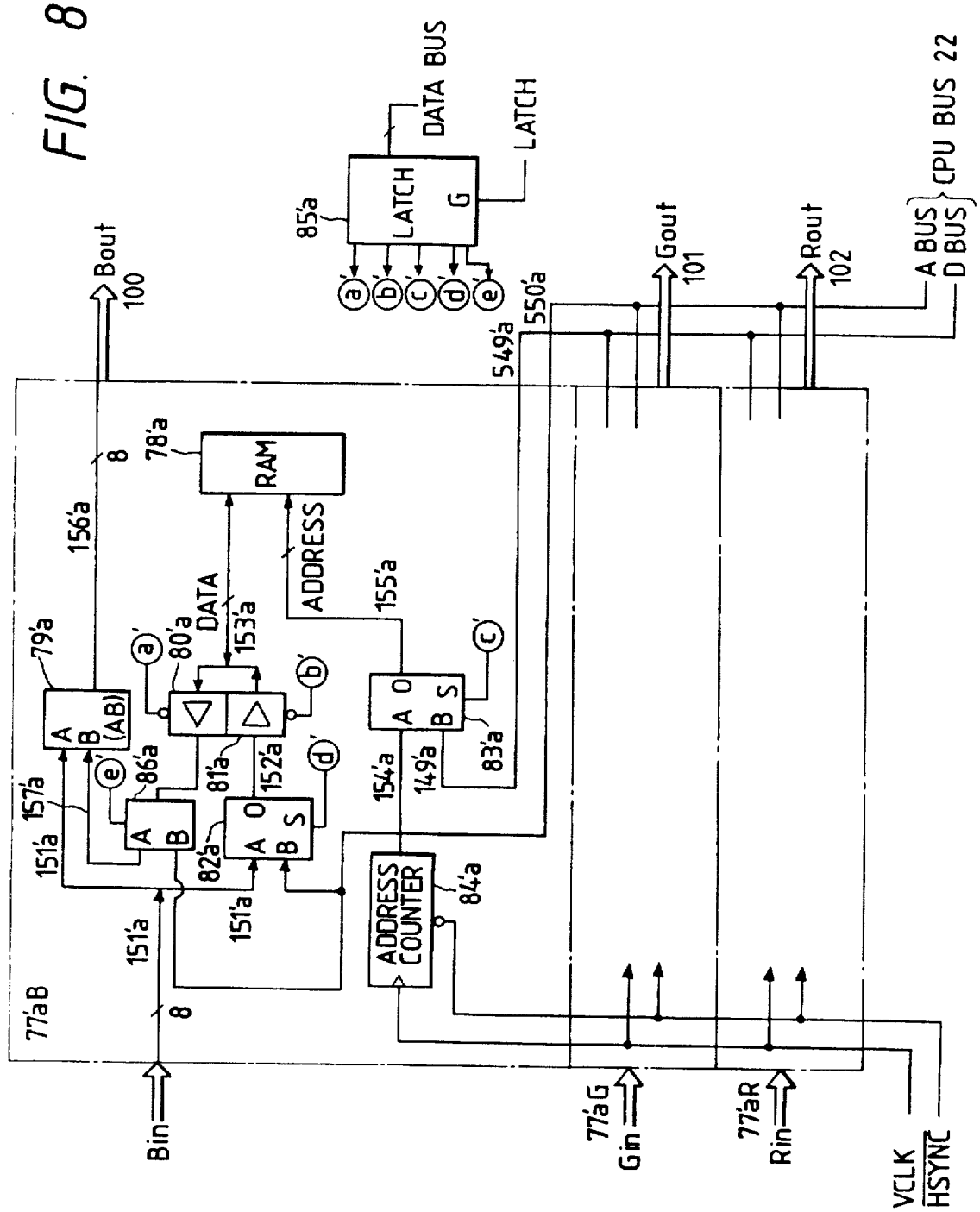
FIG. 8 is a block diagram showing a construction of a white correction circuit in the black correction/white correction circuit shown in FIG. 1.

FIG. 8 shows a construction of a white correction circuit in the black correction/white correction circuit 506a shown in FIG. 1.

In the white level correction (shading correction), the original scanning unit is moved to the position of the uniform white plate and the original is illuminated. On the basis of the white color data obtained at this time, the illuminating system, the optical system, and a sensitivity variation of the sensors are corrected.

A fundamental circuit construction of the white correction circuit is substantially the same as that shown in FIG. 6. In the black correction, the correction has been executed by the subtracter 79a. However, in the white correction, a multiplier 79'a is used and only this point is different. Therefore, the explanations of the same portions are omitted here.

Figure 9:
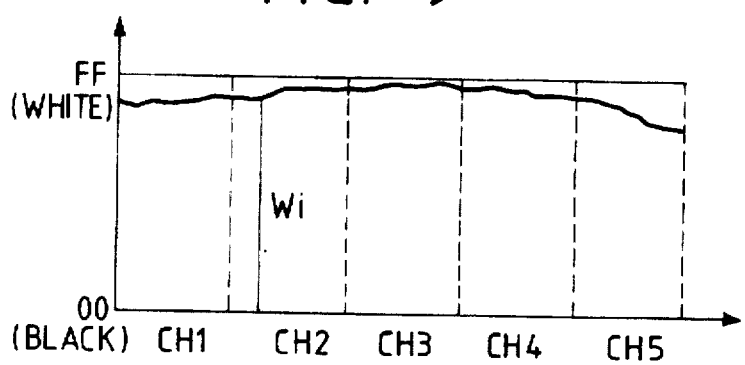
FIG. 9 is a diagram showing the concept of white correction.
Figure 10:
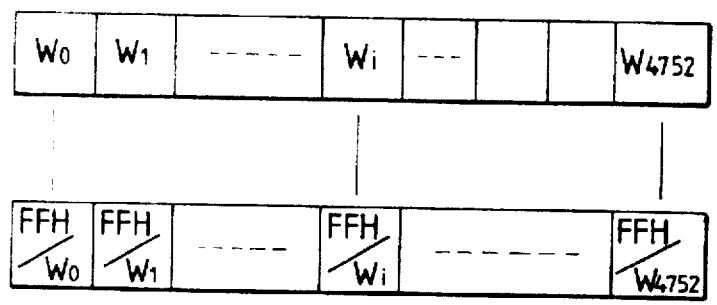
FIG. 10 is a diagram showing examples of data for a white plate.

Upon color correction, when the color CCD image sensor 101 to read an original is located at the reading position (home position) of the uniform white plate, that is, prior to the copying operation or the reading operation, the exposing lamp (not shown) is lit on and the image data at a uniform white level is stored into a correction RAM 78'a of one line. For instance, if there is a width in the longitudinal direction of the A4 size original in the main-scanning direction, there are 4752 (=16×297 mm) pixels at 16 pel/mm, that is, a capacity of the RAM is set to at least 4752 bytes. As shown in FIG. 9, in the case of white plate data $W_i$ (i=1 to 4752) of the ith pixel, the data for the white plate is stored into the RAM 78'a every pixel as shown in FIG. 10.

Figure 11:
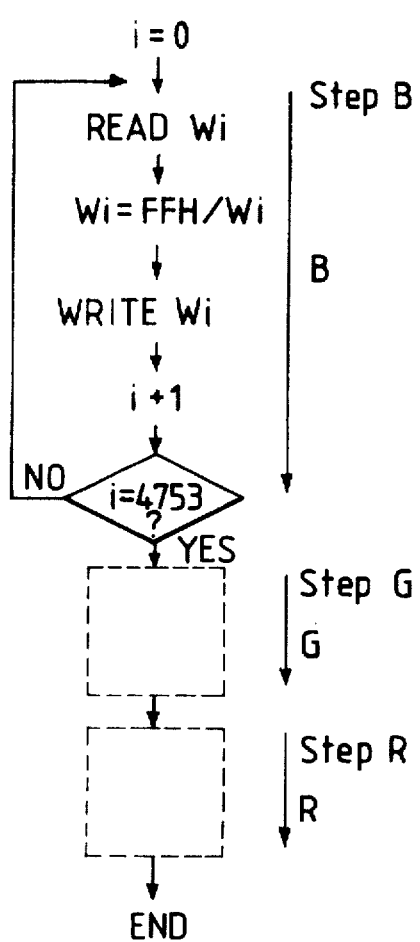
FIG. 11 is a flowchart showing a procedure of the white correction by the white correction circuit.

On the other hand, for a read value $D_i$ of an ordinary image of the ith pixel for $W_i$, data $D_O$ after the correction should be equal to $D_i \times FF_H/W_i$. Therefore, gates 80'a and 81'a are opened by the CPU 207 for (a)', (b)', (c)', and (d)' of a latch 85'a. Further, signals are supplied to selectors 82!a, 83'a, and 86'a so as to select B input terminals, respectively, thereby enabling the CPU 207 to access the RAM 78'a. Subsequently, the CPU 207 sequentially calculates $FF/W_1, \ldots$ for $FF_H/W_O$ and $FF_H/W_i$ for a head pixel $W_O$, thereby substituting the data in accordance with a procedure shown in FIG. 11. After completion of the data substitution for the blue component of the color component image (step B), the processes are likewise sequentially executed for the green component (step G) and the red component (step R). After that, the gate 80'a is opened ((a)') and the gate 81'a is closed ((b)') so that $D_O$ (=$D_i \times FF_H/W_i$) is generated for the input original image data $D_i$. The selectors 83'a and 86'a select A input terminals. The coefficient data $FF_H/W_i$ which has been read out of the RAM 78'a is transmitted along a path of the signal lines 153a→157a and is multiplied with the original image data 151a which has been supplied from one input terminal. The resultant data is generated.

As mentioned above, by executing the corrections of the black level and the white level based on various factors such as black level sensitivity of the image input system, dark current variation of the CCD, sensitivity variation among the sensors, light amount variation of the optical system, white level sensitivity, and the like, image data $B_{OUT}$ 121, $G_{OUT}$ 122, and $R_{OUT}$ 123 which have been uniformly corrected every color for both of white and black are derived in the main scanning direction. The image data of R (red), G (green) and B (blue) each consisting of eight bits which have been subjected to the white correction and the black correction are subsequently supplied to a luminance signal generation circuit 108 and a color detection circuit 109 in FIG. 1.

The luminance signal generation circuit 108 will be first described.

In the luminance signal generation circuit 108, an image which is not color separated and exists in a whole wavelength region, that is, a black and white image is produced from the color separated image which has been read by the color CCD image sensor 101. This is because the output means in the embodiment has only a monochromatic output means. In the luminance signal generation circuit 108, a calculation of the following equation is performed.

$$Data_{out}=(R+G+B)/3$$

That is, a mean value is calculated for the input R, G, and B data. In the embodiment, an adder and a multiplier have been used. The calculated luminance signal is sent to a selector 116, which will be explained hereinlater. In the embodiment, although the mean value of the R, G, and B data has simply been calculated, the luminance signal can be also obtained as $Data_{out}=0.30R+0.59G+0.11B$ or can be also derived by using only the G data.

FIG. 12 shows a construction of the color detection circuit 109 shown in FIG. 1.

The R, G, and B input data to the luminance signal generation circuit 108 are also supplied to the color detection circuit 109. In the embodiment, the hue signal has been used as a color detecting method. This is because even in the case where saturations and brightnesses differ even for the same color, it is necessary to accurately discriminate.

The color detecting method will be first schematically explained hereinbelow.

Figure 13:
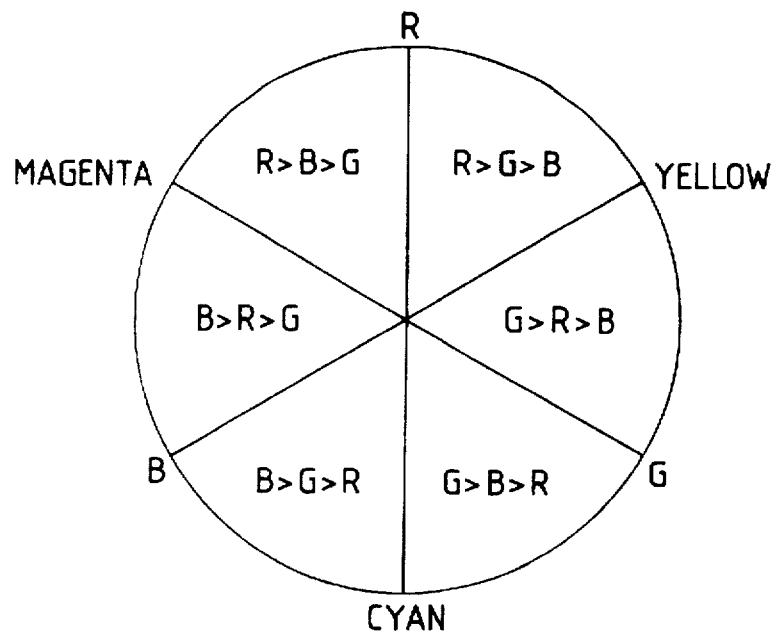
FIG. 13 is a diagram showing a hue plane for explaining color recognition.

Each of the input R, G, and B data consists of eight bits and has information of total $2^{24}$ colors. Therefore, if such a great amount of information is directly used, the apparatus becomes expensive also in terms of a circuit scale. In the embodiment, the foregoing hue has been used. Although the above hue accurately differs from the hue which is generally expressed, it is called a hue here. As known by a Munsell's solid or the like, it is known that the color space is expressed by the saturation, brightness, and hue. The R, G, and B data first need to be converted into a plane, that is, two-dimensional data. Since the common portion of R, G, and B, namely, the minimum value min(R,G,B) of the R, G, and B data corresponds to the achromatic color component, the minimum value min(R,G,B) is subtracted from each of the R, G, and B data and the remaining data are used as chromatic color components, thereby converting a three-dimensional input color space into a two-dimensional color space. As shown in FIG. 13, the converted plane within a range from 0° to 360° is divided into six regions. The hue values are obtained by the information of the order of the magnitudes of the input R, G, and B data, namely, the information such as R>G>B, R>B>G, G>B>R, G>R>B, B>G>R, and B>R>G and by the maximum value and the middle value of the input R, G, and B data by using a lookup table (LUT) or the like.

The operation of the color detection circuit 109 will now be described.

The input R, G, and B data are first supplied to a max/mid/min detection circuit 201 to discriminate the magnitudes of the R, G, and B data. Each of the input R, G, and B data is compared by using a comparator and the maximum (max) value, middle (mid) value, or minimum (min) value is generated in accordance with the result of the comparison. An output value of the comparator is generated as an order signal. For the max, mid, and min values generated, in order to subtract the achromatic color component from the max value and the mid value as mentioned above, the minimum (min) value is subtracted from the max value and the mid value by subtracters 202 and 203. Output signals of the subtracters 202 and 203 are supplied to a hue detection circuit 204 together with the order signal. The hue detection circuit 204 is constructed by a memory device such as RAM, ROM, or the like which can be accessed at random. In the embodiment, a lookup table is constructed by using an ROM. Values corresponding to angles of planes as shown in FIG. 13 have previously been stored in the ROM. The hue value is generated from the ROM in accordance with the order signal (max–min) value and (mid–min) value which are input. The generated hue value is subsequently sent to window comparators 205 and 206. Color data to be inherently patterned is supplied to the comparators 205 and 206 from data input means (not shown). Desired offset values are given to the hue data values according to the color by the CPU 207 and the resultant values are set into the comparators 205 and 206. Assuming that a set value is $a_1$, the comparator 205 generates a "1" signal for the input hue data when the hue data is smaller than the set value $a_1$. Assuming that a set value is $a_2$, the comparator 206 generates a "1" signal when the hue data is larger than the set value $a_2$.

Therefore, when $a_1$<hue data<$a_2$ a "1" signal is generated from the color detection circuit 109 by an AND gate 208 at the post stage. It will be obviously understood that a plurality of detection colors are set in the case of using a plurality of sets of window comparators.

A discrimination signal indicative of the result of the discrimination by the color detection circuit 109 is sent to an AND gate 110 and the selector 116. The AND gate 110 calculates the AND of such a discrimination signal and a pattern signal which is generated from a pattern generation circuit 111, which will be explained hereinlater. The selector 116 will be explained hereinlater.

Figure 14:
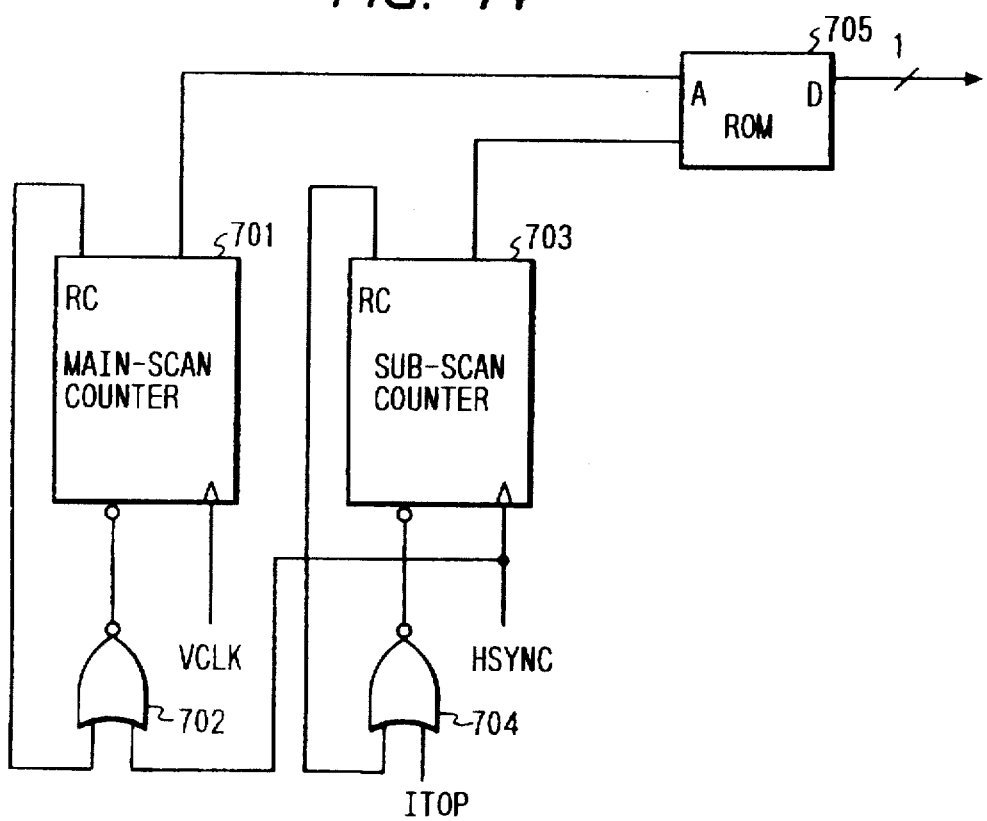
FIG. 14 is a diagram showing a pattern generation circuit 111 and an address control circuit 112 shown in FIG. 1.

The pattern generation circuit 111 and an address control circuit 112 will now be described with reference to FIG. 14.

Figures 15, 16:
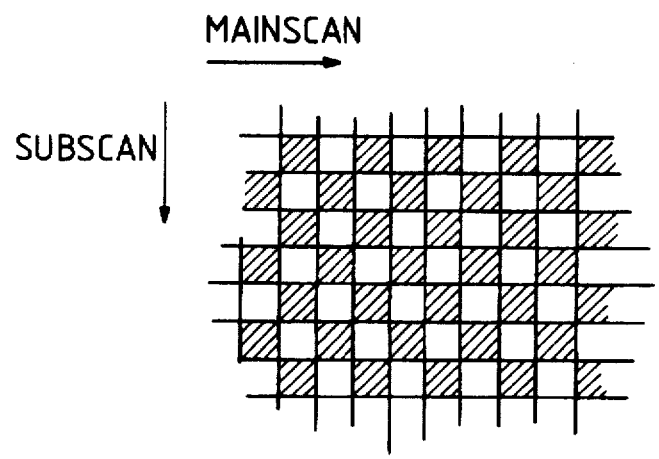
FIG. 15 is a diagram showing addresses and data in an ROM for a pattern shown in FIG. 14.
FIG. 16 is a diagram showing a pattern.
Figure 17:
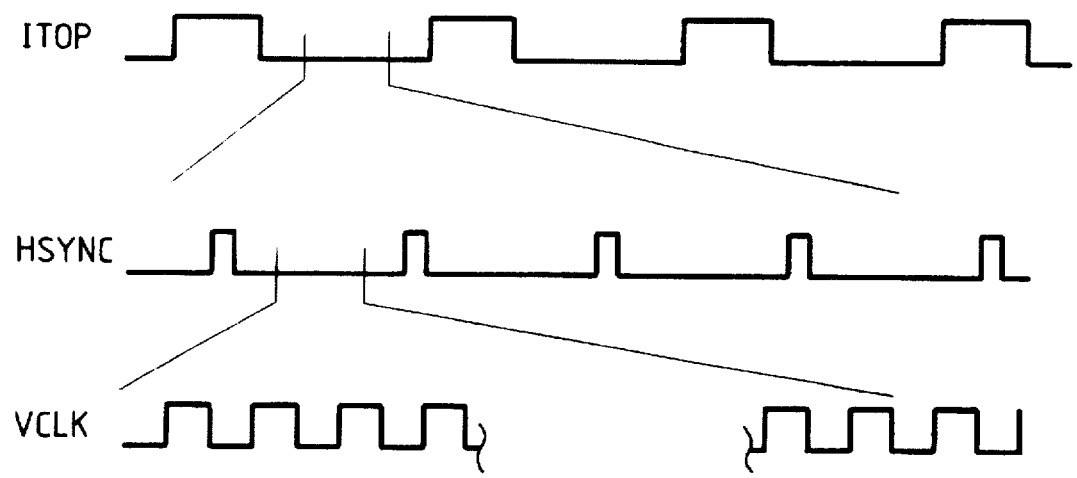
FIG. 17 is a diagram showing timings of reference control signals.

The pattern generation circuit 111 has an ROM 705 in which pattern dot data corresponding to each hue has been stored. As shown in FIG. 15, data of "1" and "0" have been written in addresses corresponding to upper and lower addresses in the ROM 705. FIG. 16 shows a pattern which is formed by the above data. As shown in FIG. 14, address signals of the ROM 705 are formed by a main-scan counter 701 and a sub-scan counter 703 which are synchronized with the pixel clock VCLK and a scan reference signal HSYNC. Reference signals ITOP, HSYNC, and VCLK are timing signals as shown in FIG. 17. The ITOP signal is a signal indicative of an image edge and is set to the low level while the scanner reads the image. The main-scan counter 701 counts the signals VCLK synchronously with the HSYNC signal. The sub-scan counter 703 counts the signals HSYNC synchronously with the ITOP signal, thereby forming an address in the pattern ROM 705. The pattern signal which has been used to calculate the AND by the AND gate 110 on the basis of the result of the discrimination by the color detection circuit 109 is supplied to a multiplier 113, by which it is multiplied to the video signal of min(R,G,B). The min(R,G,B) signal is a signal which is produced by the color detection circuit 109 and is a signal indicative of the minimum value (darkest) among the color separated video signals of the input R, G, AND B data. There is a case where the signal level of the signal which is formed by the luminance signal generation circuit 108 differs depending on the color and, for instance, the signal level for the yellow color approaches white, so that the image data of the original lacks. The min(R,G,B) is provided to prevent such a case.

Figure 18A:
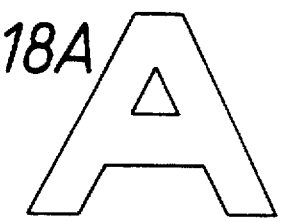
FIGS. 18A to 18C are explanatory diagrams for explaining a trimming.
Figure 18B:
Figure 18C:
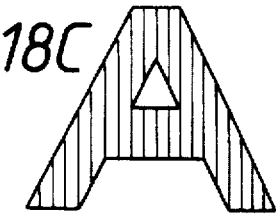

The min(R,G,B) signal is also supplied to a contour extraction circuit 114, by which a contour is extracted. The contour is extracted by a Laplacian filter which is generally known. The extracted contour signal is added to the patterned min(R,G,B) signal sent from the multiplier 113 by an adder 115. That is, the contour signal indicative of the contour and shown in FIG. 18A is added to the min(R,G,B) signal indicative of the pattern and shown in FIG. 18B, so that the min(R,G,B) signal indicative of a trimmed pattern shown in FIG. 18C is derived. A signal generated from the adder 115 is subsequently transferred to the selector 116. The foregoing luminance signal and the min(R,G,B) signal indicative of the trimmed pattern are given to the selector 116. The selector 116 executes a switching operation on the basis of the result of the detection from the color detection circuit 109. An output signal of the selector 116 is sent to a LOG conversion circuit 117 to convert the luminance signal into the concentration signal. The converted concentration signal is generated from the LOG conversion circuit 117.

By adding the contour signal to the image signal indicative of the pattern, an image as shown in FIG. 19B can be derived from an original of FIG. 19C. Even if the image has been patterned, it can be expressed without making it hard to see the image.

<Second embodiment>

Figure 20:
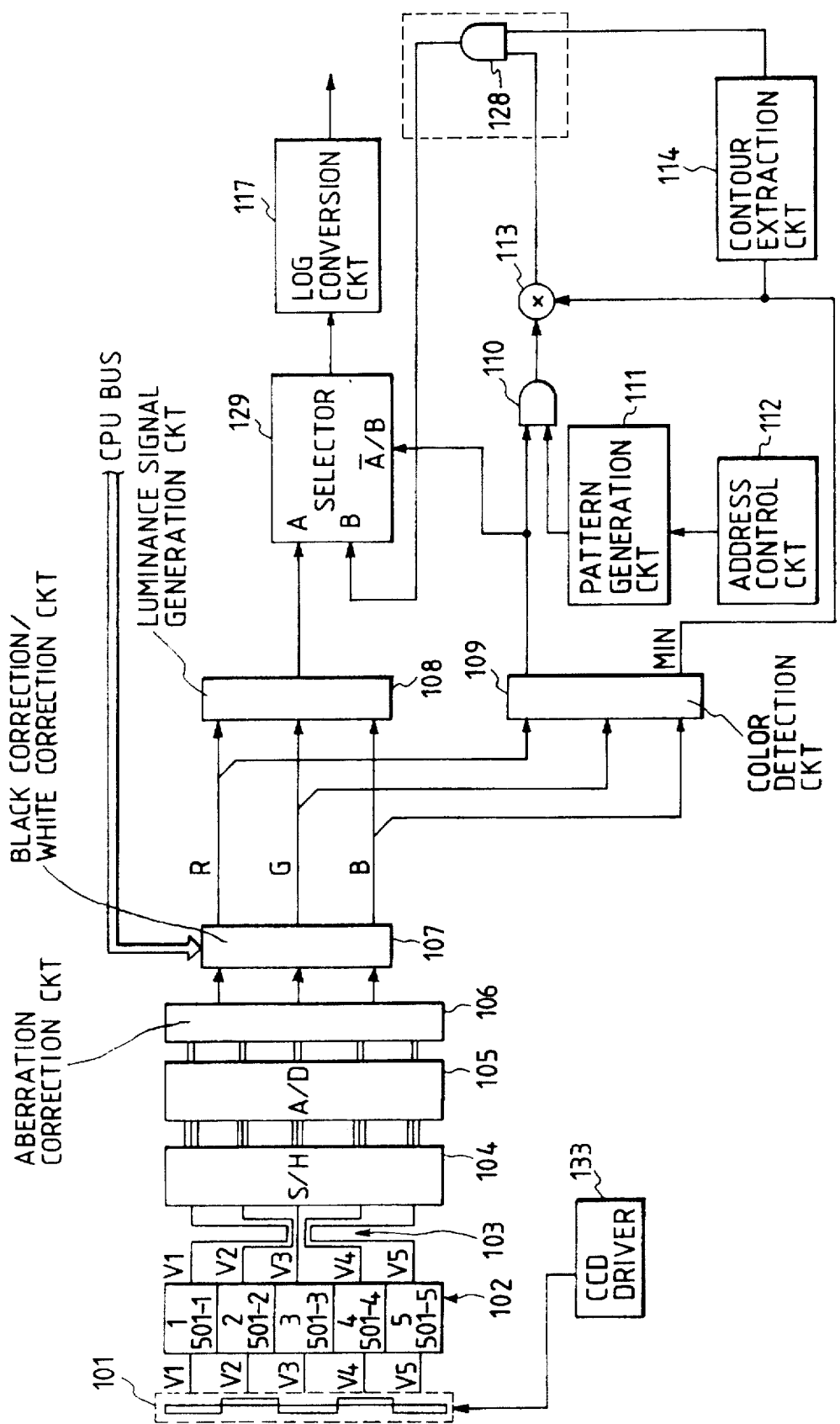
FIG. 20 is a block diagram showing the second embodiment of the invention.

FIG. 20 shows the second embodiment of the invention. The embodiment relates to an example of an image processing apparatus in the case where a white space is inserted into a contour portion.

Figures 21A, 21B:
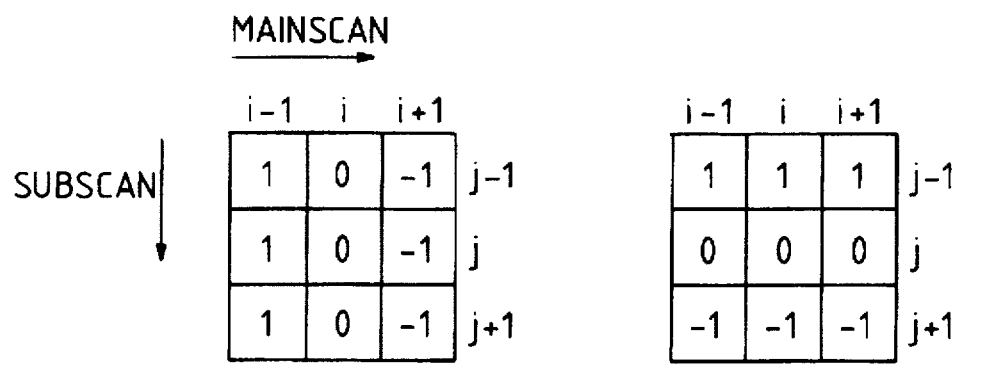
FIGS. 21A and 21B are diagrams showing filter masks for primary differentiation.

In FIG. 20, reference numerals 101 to 104, 117, and 133 denote the same portions as those in FIG. 1. The contour extraction circuit 114 executes a filtering process to perform a primary differentiating process to the min(R,G,B) signal. In the filtering process, an arithmetic operation is executed by using masks shown in FIGS. 21A and 21B. FIG. 21A shows the mask to calculate a primary differential value for the main-scanning direction. The following calculation is performed.

$$\Delta H = D_{j-1,i-1} + D_{j,i-1} + D_{j+1,i-1} - (D_{j-1,i+1} + D_{j,i+1} + D_{j+1,i+1})$$

$$D_{ij} = \min(R_{ij}, G_{ij}, B_{ij})$$

where, i: pixel number j: line number

FIG. 21B shows the mask to calculate a primary differentiation value for the sub-scanning direction. The following calculation is executed.

$$\Delta V = D_{j-1,i-1} + D_{j-1,i} + D_{j-1,i+1} - (D_{j+1,i-1} + D_{j+1,i} + D_{j+1,i+1})$$

Figure 22:
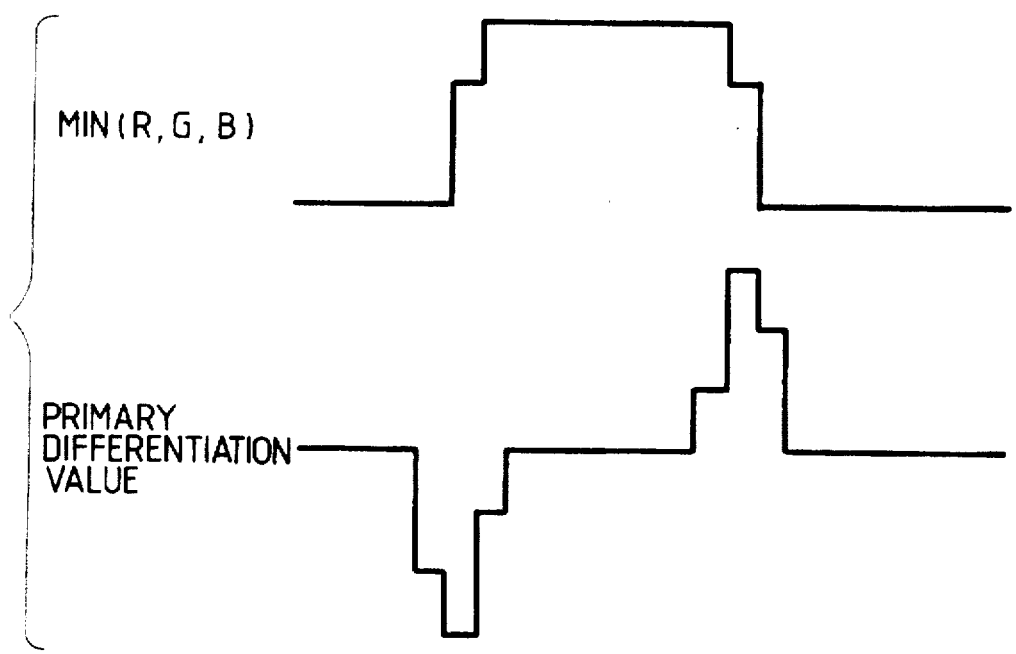
FIG. 22 is an explanatory diagram for explaining a primary differentiating process.

FIG. 22 shows the relation between the input min(R,G,B) signal and the primary differentiation value in only a single direction.

The value indicative of the sum of the absolute values of those primary differentiation values is obtained as a primary differentiation value S.

$$S = |\Delta H| + |\Delta V|$$

A predetermined slice level T is arbitrarily set for the value of S derived as mentioned above. A "0" or "1" signal is generated on the basis of the following conditions.

S>T... 0 signal

S≧T... 1 signal

Figure 23A:
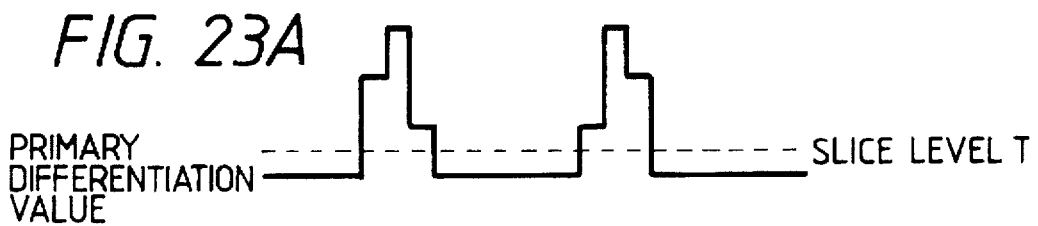
FIGS. 23A and 23B are diagrams showing the relations between the primary differential value and the output signal.
Figure 23B:
Figure 24C:
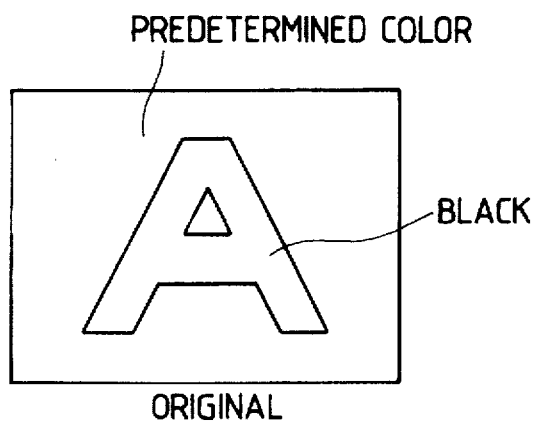
FIGS. 24A to 24C are diagrams showing the trimming according to the second embodiment.
Figure 24A:
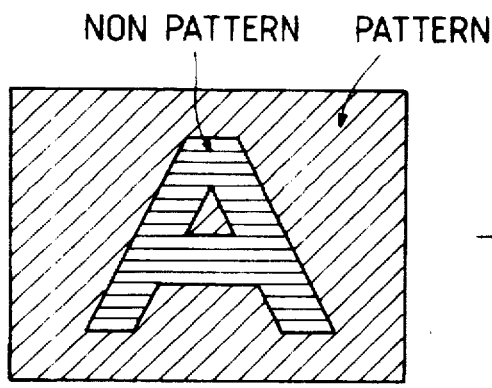
Figure 24B:
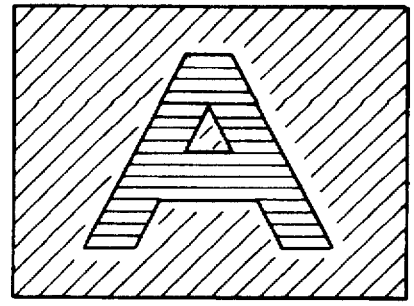

FIGS. 23A and 23 B show examples of a primary differentiation value and an output signal. The AND of the output signal and the patterned min(R,G,B) signal is subsequently calculated by an AND gate 128. That is, in the edge portion of S>T, the patterned min(R,G,B) signal is masked and is supplied to a selector 129. As shown in FIGS. 24A to 24C, in an image which has simply been patterned as shown in FIG. 24A from an original of FIG. 24C, a white portion is formed between the pattern and a non-pattern as shown in FIG. 24B, so that the non-pattern portion can be easily seen.

Although an example in which two filters are used as a contour extraction circuit 114 has been described, it is also possible to cope with both of the main-scanning direction and the sub-scanning direction by one filter.

On the other hand, to enable an edge to be easily discriminated, the maximum value signal (max signal) can be also used in place of the minimum value signal (min signal) or the luminance signal can be also used.

<Third Embodiment>

Figures 1, 25:
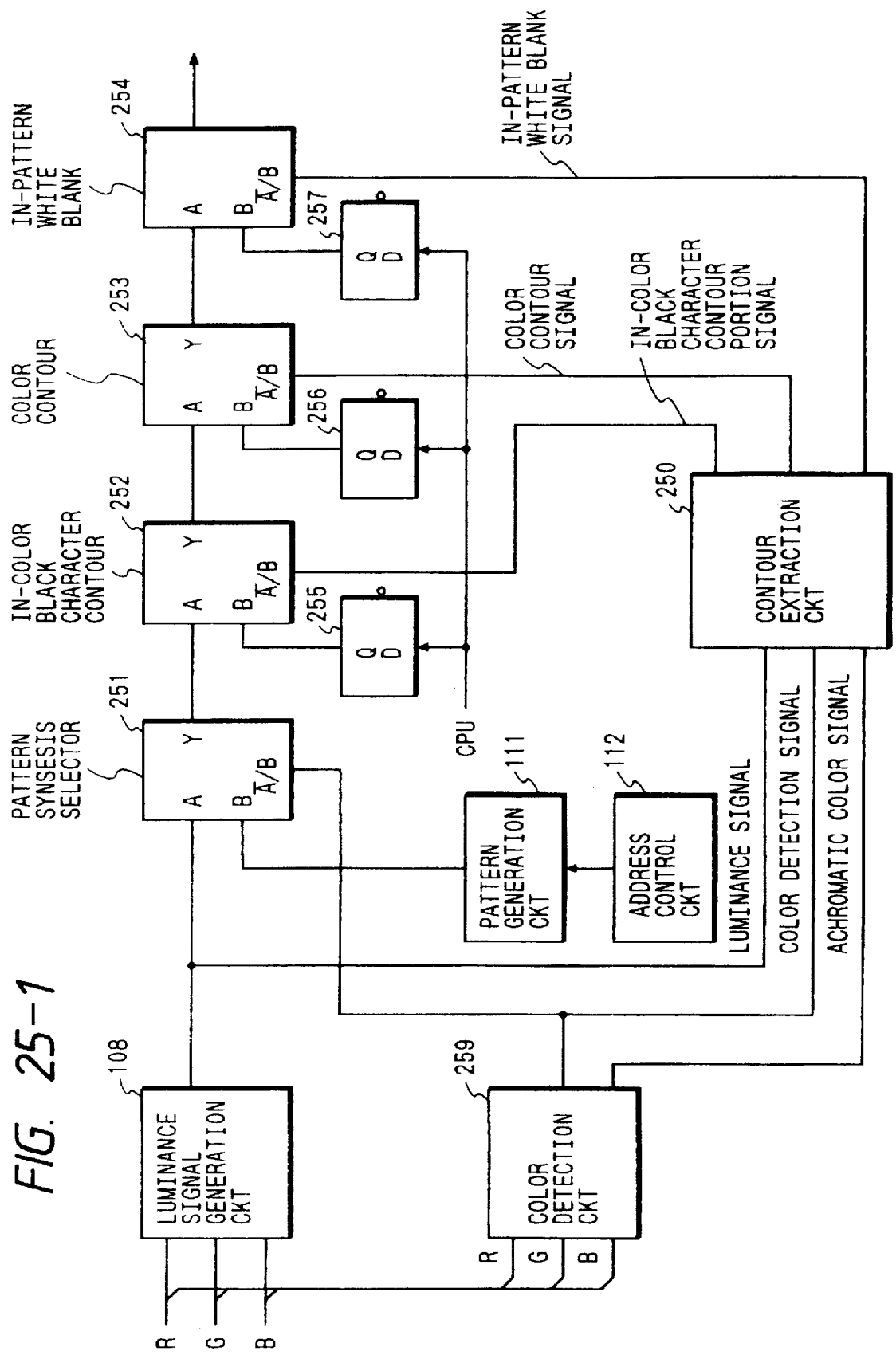
Figures 2, 25:
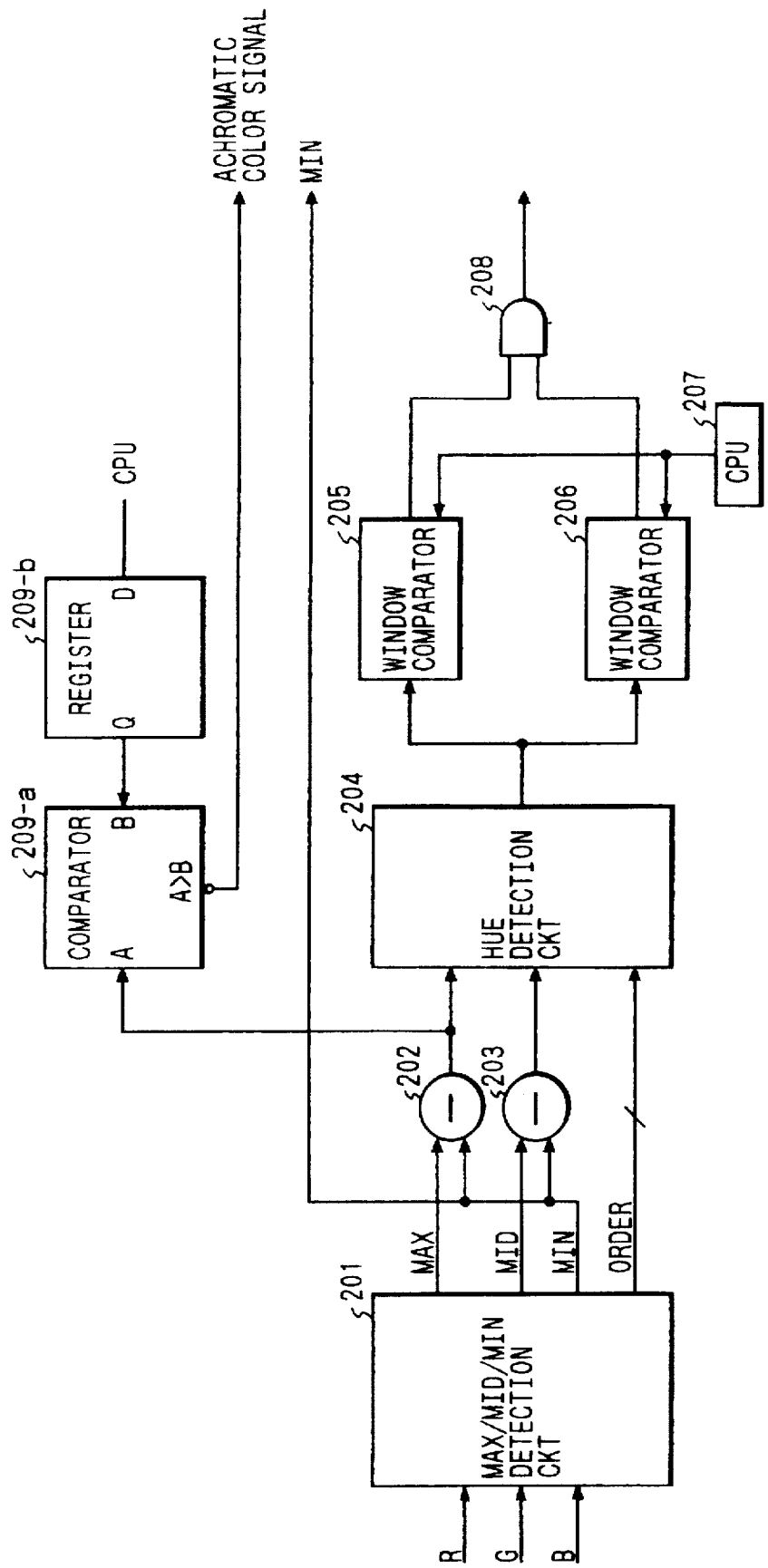

FIGS. 25-1 to 25-2 show the third embodiment of the invention. The embodiment relates to an example in the case where a white blank contour is provided between a black character and a pattern and a black contour is provided between the pattern and a white image and a white contour is provided for the inside (pattern side) of the black contour.

FIG. 25-1 is a block diagram showing a construction of a contour process in the third embodiment. Since a circuit construction until the luminance signal generation circuit 108, the pattern generation circuit 111, and the address control circuit 112 are similar to the foregoing first and second embodiments, their descriptions are omitted here. A color detection circuit 259 will be first explained with reference to FIG. 25-2. The color detection circuit 259 is fundamentally similar to the color detection circuit 109 in the first and second embodiments. However, a circuit to obtain an achromatic color signal is added in addition to the circuit 109 in the first and second embodiments. An output of the subtracter 202 to subtract the minimum value from the maximum value is supplied to a comparator 209-a and is compared with a value which has been set by the CPU (not shown). A comparison result is generated from the comparator 209-a. That is, when a difference between the maximum value and the minimum value of the input R, G, and B data is small, the pixel data is determined to be an achromatic color. The color detection signal detected by the color detection circuit 259 on the basis of the input R, G, and B data is supplied to a contour extraction circuit 250 in FIG. 25-1 and as a selection signal to a pattern synthesis selector 251. The output signal from the luminance signal generation circuit 108 and the output signal from the pattern generation circuit 111 are given to the selector 251. When the color detection signal is at the "1" level, in other words, when a predetermined color has been detected, a B input terminal is selected. If no color is detected, an A input terminal is selected, namely, the luminance signal from the luminance signal generation circuit 108 is selected.

The contour extraction circuit 250 extracts three kinds of contour signals shown in FIGS. 26A, to 26C from the input luminance signal and color detection signal. FIG. 26A shows the contour signal to form a white blank portion at a boundary between the patterned image and a black character. FIG. 26B shows the contour signal to form a black contour between a pattern which has been obtained by patterning a predetermined color and a background bright image. FIG. 26C shows the contour signal to further add a white contour to the inside of the black contour of FIG. 26B. FIG. 26C is provided to obtain a middle blank line for an image with a narrow image width such as a thin line or the like expressed by a predetermined color. The construction and operation of the contour extraction circuit will be explained in detail hereinlater.

The above contour signals are respectively supplied to selectors 252 to 254 to add the contour signals to the image data. The image signal is given to an A input terminal of each of the selectors 252 to 254. Predetermined values which have been set in registers 255 to 257 by the CPU (not shown) are given to B input terminals of the selectors 252 to 254. Each selector switches the image signal and the predetermined value on the basis of the contour signal. The selector 252 generates the image shown in FIG. 26A. The selector 253 generates the image shown in FIG. 26B. The selector 254 generates the image shown in FIG. 26C.

Figure 27:
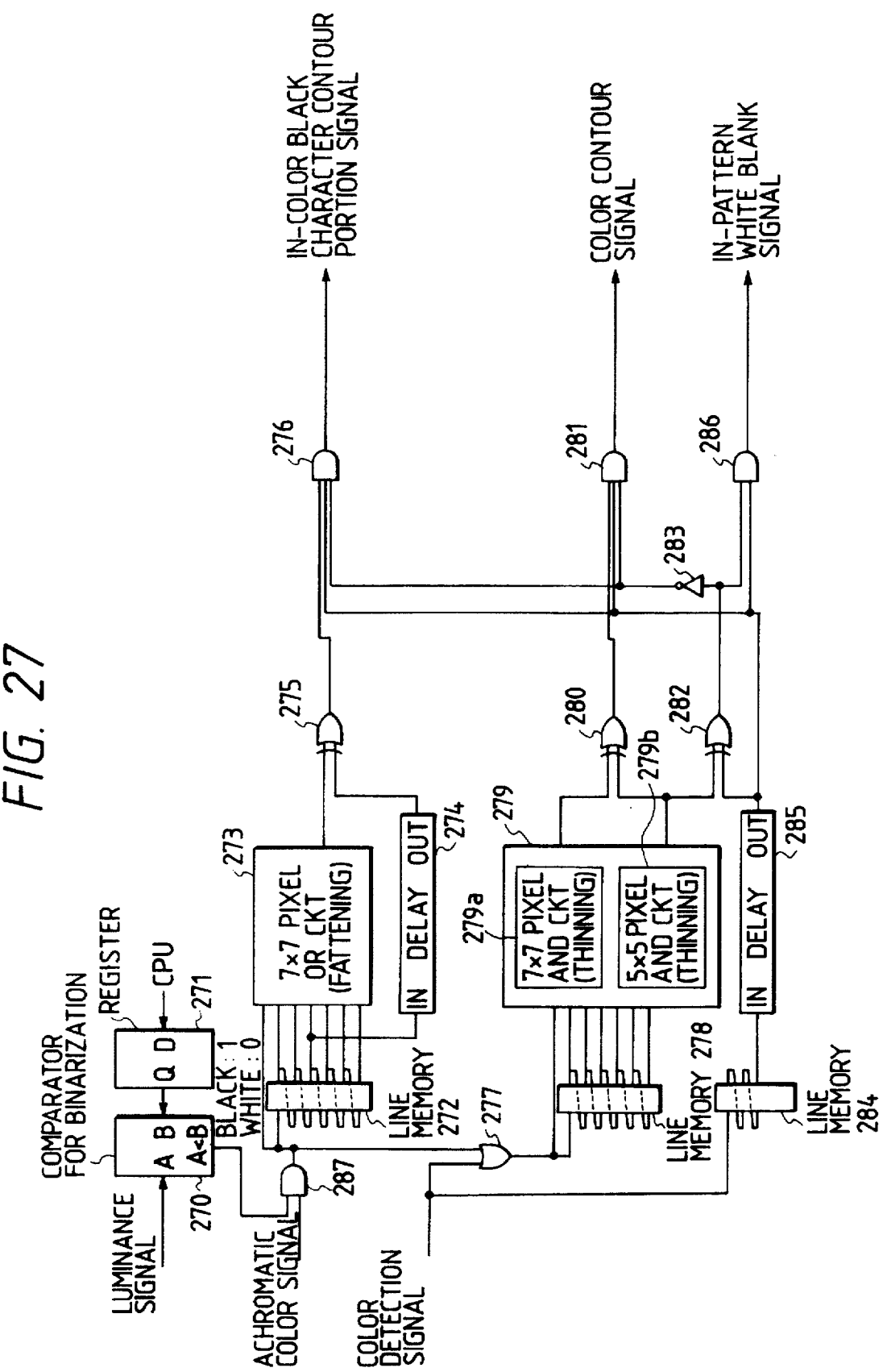
FIG. 27 is a block diagram showing a construction of a contour detection circuit of the third embodiment.
Figure 29:
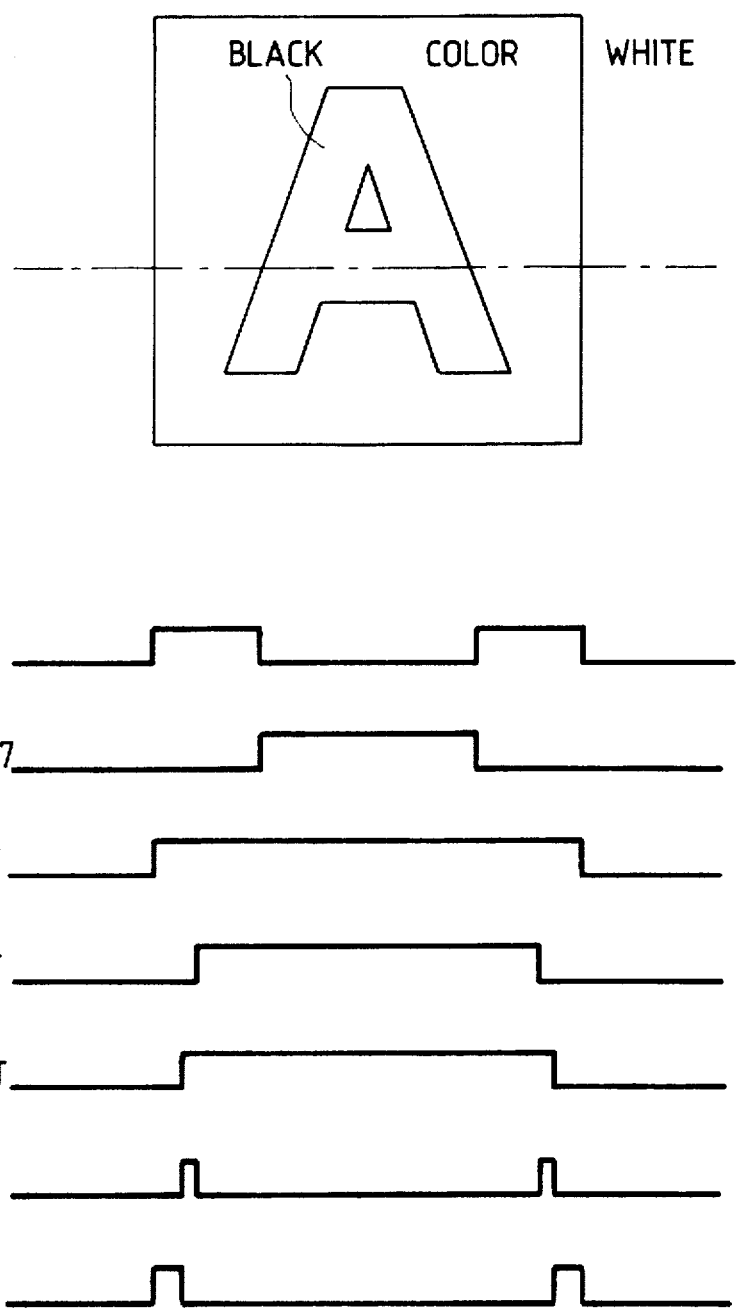

The contour extraction circuit 250 will now be described with reference to FIGS. 27, 28, and 29.

The luminance signal generated from the luminance signal generation circuit 108 is binarized by a comparator 270. FIG. 28 shows examples of outputs. A slice level for binarization is set into a register 271 by the CPU (not shown). An AND gate 287 calculates the AND of the binarized signal and the achromatic color signal. That is, the AND gate 287 generates a "1" signal in the case where the image has an achromatic color and a predetermined concentration. The AND gate 287 generates a "0" signal in the other cases. The output signal is delayed by a predetermined number of lines (minimum six lines) by a line memory 272. The delayed signal is sent to an OR circuit 273 to calculate the OR of 7×7 pixels. A signal which has been expanded by a predetermined number of pixels by the OR circuit 273 and a target pixel signal which has been delayed by a predetermined number of pixels by a delay circuit 274 are supplied to an EX-OR gate 275 to calculate the EX-OR. Thus, the EX-OR gate 275 generates a contour signal indicative of a contour portion of the image having an achromatic color concentration. The output signal of the AND gate 287 and the color detection signal are sent to an OR gate 277, by which the OR is calculated. An output signal of the OR gate 277 is delayed by a predetermined number of lines (six lines or more) by a line memory 278. After that, the delayed signal is supplied to a circuit 279 comprising an AND circuit 279a to calculate the AND of 7×7 pixels and an AND circuit 279b to calculate the AND of 5×5 pixels. The signal is thinned by a predetermined number of pixels by both of the AND circuits 279a and 279b. Output signals of the AND circuits 279a and 279b are supplied to an EX-OR gate 280. A signal as shown in FIG. 29 is obtained from the EX-OR gate 280. The color detection signal is delayed by a time corresponding to a predetermined number of lines by a line memory 284 and is, further, delayed by a time corresponding to a predetermined number of pixels by a delay circuit 285. After that, an output signal of the delay circuit 285 and the output signal from the AND circuit 279b of 5×5 pixels are supplied to an EX-OR gate 282, so that a signal shown in FIG. 29 is generated from the EX-OR gate 282. Output signals from the EX-OR gates 275, 280, and 282 are supplied to AND gates 276, 281, and 286, from which an in-color black character contour portion signal, a color contour signal, and an in-pattern white blank signal are derived. Those signals are supplied to the selectors shown in FIG. 25-1 and each contour data in the pattern shown in FIG. 26C is added to the read image.

The trimming process can be also executed by one or two of the in-color black character contour portion signal, the color contour signal, and the in-pattern white blank signal as necessary.

<Fourth embodiment>

The case of adding a contour to a boundary portion between colors when different patterning processes are executed to a plurality of colors will now be described with reference to FIG. 30. With respect to the color detection circuit, a plurality of sets of window comparators are provided for an output of the hue detection circuit 204 to execute the discrimination as shown in FIG. 12 and a plurality of different colors are detected by using the color detection signals as a plurality of bits. With regard to the pattern synthesis as well, there are provided selectors which generate different patterns in accordance with states of a plurality of bits. Therefore, the pattern generation circuit has a plurality of pattern generators. The description regarding the detailed circuit operation is omitted here and only the contour extraction circuit will now be explained.

In the embodiment, recognition codes of eight colors, that is, color codes of 3 bits are provided. For COLA (0-2) shown in FIG. 30, COLB (0-2) denotes a signal which has been delayed by one line by a line memory (not shown) and COLC (0-2) denotes a signal which has, further, been delayed by another one line. The respective input signals are delayed by predetermined pixels by flip-flops 301a to 303c. That is, a matrix of 3×3 shown in each of FIGS. 31A to 31D is constructed. Those signals are supplied to equal-plane comparators 304a to 304d each of which generates a "1" signal when both of input signals are equal, by which checks are made to see if the discrimination colors differ or not with respect to four kinds of directions shown in FIGS. 31A to 31D, respectively. Output signals from the comparators 304a to 304d are waveform shaped by a flip-flop 305 and, after that, they are sent to a 4-input NAND circuit 306, from which a color boundary signal is generated. That is, if the discrimination color code in even one of the four directions shown in FIG. 31 differs, a color boundary is determined and a color boundary signal serving as a contour signal is generated.

FIG. 31A shows the matrix to discriminate whether the colors before and after a target pixel are identical or not. FIG. 31B shows the matrix to discriminate whether the colors over and under the target pixel are identical or not. FIGS. 31C and 31D show the matrices to discriminate whether the color codes in the oblique directions are identical or not, respectively. The color boundary signal which has been discriminated as mentioned above is supplied to the selector to add a contour. Since a method of adding a contour to the image signal is substantially similar to that of the third embodiment, its description is omitted here. According to the fourth embodiment, as shown in FIG. 32B, the boundary between the first and second colors is clearer as compared with the case of FIG. 32A and the color image of the original image of FIG. 32C can be easily discriminated.

As described above with respect to the first to fourth embodiments, the color image portion of the original image can be easily distinguished from the other image portion.

Although a predetermined color of the color image has been patterned in the embodiments, the hue can be also controlled by a concentration level instead of the pattern. Such a control has been described in detail in U.S. patent application Ser. No. 664,934 (filed Mar. 5, 1991) corresponding to Japanese Patent Application No. 2-51644 (1990).

The invention is not limited to the case of printing by the printer but can be also applied to various apparatuses as in the case of displaying by a display, the case of transmitting by a facsimile apparatus, the case of storing into a file, and the like.

As described above, according to the invention, since the boundary between the color discrimination image and the other image has been trimmed, there is an advantage such that the image such as a character or the like which has conventionally been hard to see when the discriminating process had been executed can be made easy to see.

The present invention is not limited to the foregoing embodiment but many modifications and variations are possible within the spirit and scope of the appended claims of the invention.

What is claimed is:

1. An image processing apparatus comprising:

input means for inputting an image including a color image portion;

color discriminating means for discriminating a color of the image input by said input means;

first generating means for generating a graphic pattern image corresponding to a result of the color discrimination by said color discriminating means;

second generating means for detecting a contour of an area of the color of the input image and generating a visible outline image representing the contour;

synthesizing means for synthesizing the graphic pattern image generated by said first generating means and the visible outline image generated by said second generating means; and output means for outputting either one of the image input from said input means and an image synthesized by said synthesizing means, in accordance with a discriminated result of said color discriminating means.

2. An apparatus according to claim 1, wherein said color discriminating means discriminates plural areas each such area having a different color, and said first generating means generates the image of the area in each color discriminated by said color discriminating means, into a different pattern image.

3. An apparatus according to claim 1, wherein said first generating means does not generate the image of the area which is not discriminated by said color discriminating means as the area having the predetermined color, into the pattern image.

4. An apparatus according to claim 1, further comprising reader means for reading a color image as the input image.

5. An image processing apparatus comprising:

color discriminating means for discriminating a color of an input image;

converting means for converting the input image into a graphic pattern image in accordance with a result of the color discrimination by said color discriminating means;

generating means for generating a visible line representing an outline, around the graphic pattern image converted by said converting means; and output means for outputting the graphic pattern image converted by said converting means and the visible line generated by said generating means, on an area which is discriminated to have the color discriminated by said color discriminating means, and for outputting the input image not converted by said converting means, on an area which is not discriminated to have the color discriminated by said color discriminating means.

6. An apparatus according to claim 5, wherein said color discriminating means discriminates plural areas each such area having a different color, and said generating means generates the image of the area in each color discriminated by said color discriminating means, into a different pattern image.

7. An apparatus according to claim 5, wherein said generating means does not generate the image of the area which is not discriminated by said color discriminating means as the area having the predetermined color, into the pattern image.

8. An apparatus according to claim 5, further comprising reader means for reading a color image as the input image.

9. An image processing method comprising:

an input step of inputting an image including a color image portions;

a color discriminating step of discriminating a color of the image input by said input means;

a first generating step of generating a graphic pattern corresponding to a result of the color discrimination;

a second generating step of detecting a contour of an area of the color of the input image and generating a visible outline image representing the contour;

a synthesizing step of synthesizing the graphic pattern image generated by said first generating step and the visible outline image generated by said second generating step; and an output step of outputting either one of the image input from said input means and an image synthesized by said synthesizing step, in accordance with a discriminated result of said color discriminating step.

10. A method according to claim 9, wherein said discriminating step discriminates plural areas each such area having a different color, and said first generating step generates the image of the area in each color discriminated in said discriminating step, into a different pattern image.

11. A method according to claim 9, wherein said first generating step does not generate the image of the area which is not discriminated in said discriminating step as the area having the predetermined color, into the pattern image.

12. A method according to claim 9, further comprising a reading step of reading a color image as the input image.

13. An image processing method comprising the steps of:

color discriminating a color an input image;

converting the input image into a graphic pattern corresponding to a result of the color discrimination; and a generating step of generating a visible line representing an outline, around the graphic pattern image converted by said converting step; and an output step of outputting the graphic pattern image converted by said converting step and the visible line generated by said generating step, on an area which is discriminated to have the color discriminated by said color discriminated step, and for outputting the input image not converted by said converting step, on an area which is not discriminated to have the color discriminated by said color discriminating step.

14. A method according to claim 13, wherein said discriminating step discriminates plural areas each such area having a different color, and said generating step generates the image of the area in each color discriminated in said discriminating step, into a different pattern image.

15. A method according to claim 13, wherein said generating step does not generate the image of the area which is not discriminated in said discriminating step as the area having the predetermined color, into the pattern image.

16. A method according to claim 13, further comprising a reading step of reading a color image as the input image.

17. An image processing apparatus comprising:

input means for inputting an image including a color image portion;

color discriminating means for discriminating an area in the image input by said input means, the area having a predetermined color;

converting means for converting an image of the area discriminated by said discriminating means, into a graphic pattern image corresponding to the predetermined color;

generating means for detecting a contour of the area in the input image and generating a visible outline image representing the contour;

synthesizing means for synthesizing the graphic pattern image converted by said converting means and the visible outline image generated by said generating means; and output means for outputting either one of the image input from the input means and an image synthesized by said synthesizing means, in accordance with a discriminated result of said color discriminating means.

18. An apparatus according to claim 17, wherein said discriminating means discriminates plural areas each such area having a different color, and said converting means converts the image of the area in each color discriminated by said discriminating means, into a different pattern image.

19. An apparatus according to claim 17, wherein said converting means does not convert the image of the area which is not discriminated by said discriminating means as the area having the predetermined color, into the pattern image.

20. An apparatus according to claim 17, further comprising reading means for reading a color image as the input image.

21. An image processing method comprising the steps of:

input means for inputting an image including a color image portion;

color discriminating an area in the image input by said input means, the area having a predetermined color;

converting an image of the area discriminated in said discriminating step, into a graphic pattern image corresponding to the predetermined color;

detecting a contour of the area in the input image and generating a visible outline image representing the contour;

synthesizing the converted graphic pattern image and the generated visible outline image; and outputting either one of the image input from said input means and a synthesized image, in accordance with a discriminated result of said color discriminating means.

22. A method according to claim 21, wherein in said discriminating step, plural areas each such area having a different color are discriminated, and in said converting step, the image of the discriminated area in each color is converted into a different pattern image.

23. A method according to claim 21, wherein, in said converting step, the image of the area which is not discriminated in said discriminating step as the area having the predetermined color is not converted into the pattern image.

24. A method according to claim 21, further comprising a reading step of reading a color image as the input image.

25. An image processing apparatus comprising:

input means for inputting an image including a color image portion;

color discriminating means for discriminating a color of the image input by said input means;

first generating means for generating a predetermined graphic pattern image having a density corresponding to a result of the color discrimination by said color discriminating means;

second generating means for detecting a contour of an area of the color of the input image and generating a visible outline image representing the contour;

synthesizing means for synthesizing the predetermined graphic pattern image generated by said first generating means and the visible outline image generated by said second generating means; and output means for outputting either one of the image input from said input means and an image synthesized by said synthesizing means, in accordance with a discriminated result of said color discriminating means.

26. An apparatus according to claim 25, further comprising reading means for reading a color image as the input image.

27. An image processing method comprising:

an input step of inputting an image including a color image portion;

a color discriminating step of discriminating a color of the image input by said input step;

a first generating step of generating a graphic pattern image having a density corresponding to a result of the color discrimination;

a second generating step of detecting a contour of an area of the color of the input image and generating a visible outline image representing the contour;

a synthesizing step of synthesizing the graphic pattern image generated by said first generating step and the visible outline image generated by said second generating step; and an output step of outputting either one of the image input by the input step and an image synthesized by said synthesizing step, in accordance with a discriminated result of said color discriminating step.

28. A method according to claim 27, further comprising a reading step of reading a color image as the input image.

* * * * *

UNITED STATES PATENT AND TRADEMARK OFFICE
CERTIFICATE OF CORRECTION

PATENT NO. : 5,760,929
DATED : June 2, 1998
INVENTORS : ICHIKAWA HIROYUKI ET AL.

It is certified that error appears in the above-identified patent and that said Letters Patent is hereby corrected as shown below:

COLUMN 6 line 8, "82!a," should read --82'a,--.

COLUMN 12 line 2, "waveform" should read --waveforms--.

COLUMN 13 line 48, "portions;" should read --portion;--.

COLUMN 14 line 11, "color" (second occurrence) should read --color of--.
line 21, "discriminated" should read --discriminating--.

Signed and Sealed this

Ninth Day of February, 1999

Attest:

*Acting Commissioner of Patents and Trademarks*

*Attesting Officer*